United States Patent
Sato

(10) Patent No.: US 12,072,927 B2
(45) Date of Patent: Aug. 27, 2024

(54) IMAGE DESCRIPTOR NETWORK WITH IMPOSED HIERARCHICAL NORMALIZATION

(71) Applicant: Magic Leap, Inc., Plantation, FL (US)

(72) Inventor: Koichi Sato, San Jose, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 18/368,153

(22) Filed: Sep. 14, 2023

(65) Prior Publication Data

US 2024/0004925 A1    Jan. 4, 2024

Related U.S. Application Data

(63) Continuation of application No. 17/242,251, filed on Apr. 27, 2021, now Pat. No. 11,797,603.
(Continued)

(51) Int. Cl.
*G06F 16/56*    (2019.01)
*G06F 18/214*    (2023.01)
(Continued)

(52) U.S. Cl.
CPC ............ *G06F 16/56* (2019.01); *G06F 18/214* (2023.01); *G06N 3/08* (2013.01); *G06V 10/454* (2022.01);
(Continued)

(58) Field of Classification Search
CPC ........ G06F 16/56; G06F 18/214; G06F 18/22; G06F 16/583; G06F 16/51; G06F 16/53;
(Continued)

(56) References Cited

U.S. PATENT DOCUMENTS

| 8,879,813 B1 | 11/2014 | Solanki et al. |
| 9,177,224 B1 | 11/2015 | Heller et al. |

(Continued)

FOREIGN PATENT DOCUMENTS

| CN | 104903934 A | 9/2015 |
| CN | 106488215 A | 3/2017 |

(Continued)

OTHER PUBLICATIONS

U.S. Appl. No. 16/190,948, "Corrected Notice of Allowability", Mar. 15, 2021, 3 pages.
(Continued)

*Primary Examiner* — Michael S Osinski
(74) *Attorney, Agent, or Firm* — KILPATRICK TOWNSEND & STOCKTON LLP

(57) ABSTRACT

Techniques are disclosed for using and training a descriptor network. An image may be received and provided to the descriptor network. The descriptor network may generate an image descriptor based on the image. The image descriptor may include a set of elements distributed between a major vector comprising a first subset of the set of elements and a minor vector comprising a second subset of the set of elements. The second subset of the set of elements may include more elements than the first subset of the set of elements. A hierarchical normalization may be imposed onto the image descriptor by normalizing the major vector to a major normalization amount and normalizing the minor vector to a minor normalization amount. The minor normalization amount may be less than the major normalization amount.

20 Claims, 24 Drawing Sheets

Related U.S. Application Data

(60) Provisional application No. 63/019,211, filed on May 1, 2020.

(51) Int. Cl.
  *G06N 3/08* (2023.01)
  *G06V 10/44* (2022.01)
  *G06V 10/46* (2022.01)
  *G06V 10/764* (2022.01)
  *G06V 10/82* (2022.01)

(52) U.S. Cl.
  CPC .......... *G06V 10/469* (2022.01); *G06V 10/764* (2022.01); *G06V 10/82* (2022.01)

(58) Field of Classification Search
  CPC ............... G06F 18/213; G06F 16/5866; G06F 18/2413; G06F 18/24133; G06N 3/08; G06N 3/084; G06N 3/045; G06N 3/04; G06N 3/044; G06N 3/048; G06V 10/454; G06V 10/469; G06V 10/764; G06V 10/82; G06V 10/26; G06V 10/7715; G06V 10/25; G06V 10/774; G06T 2207/20081; G06T 2207/20084; G06T 7/11; G06T 3/40
  See application file for complete search history.

(56) References Cited

U.S. PATENT DOCUMENTS

| | | | |
|---|---|---|---|
| 9,280,821 | B1 | 3/2016 | Choe et al. |
| 10,776,918 | B2* | 9/2020 | Wang ................... G06V 10/758 |
| 10,783,398 | B1 | 9/2020 | Ranzinger et al. |
| 10,977,554 | B2 | 4/2021 | Rabinovich et al. |
| 11,182,424 | B2 | 11/2021 | Murali |
| 11,373,301 | B2* | 6/2022 | Ogino ................... A61B 6/5217 |
| 11,498,776 | B1* | 11/2022 | Sikka ..................... G06N 5/048 |
| 11,508,188 | B2* | 11/2022 | Lee ......................... G06V 10/60 |
| 11,537,894 | B2 | 12/2022 | Rabinovich et al. |
| 11,604,993 | B1 | 3/2023 | Tan |
| 11,797,603 | B2 | 10/2023 | Sato |
| 11,842,283 | B2* | 12/2023 | Okuno ................... G06F 18/24 |
| 11,909,939 | B2* | 2/2024 | Kubota .................. H04N 1/405 |
| 2011/0103691 | A1 | 5/2011 | Yun |
| 2012/0090009 | A1 | 4/2012 | Cook et al. |
| 2013/0216135 | A1 | 8/2013 | Pau |
| 2014/0226906 | A1 | 8/2014 | Kang |
| 2015/0110348 | A1 | 4/2015 | Solanki et al. |
| 2015/0161468 | A1 | 6/2015 | Higa |
| 2016/0012317 | A1 | 1/2016 | Mayle et al. |
| 2016/0189000 | A1* | 6/2016 | Dube ...................... G06F 18/22 382/160 |
| 2016/0224344 | A1 | 8/2016 | Moudgill et al. |
| 2016/0300121 | A1 | 10/2016 | Chertok et al. |
| 2017/0186171 | A1* | 6/2017 | Hsieh ....................... G06T 7/593 |
| 2017/0337733 | A1* | 11/2017 | Georgescu ............... G06T 7/97 |
| 2018/0012110 | A1 | 1/2018 | Souche et al. |
| 2018/0053056 | A1 | 2/2018 | Rabinovich et al. |
| 2018/0268256 | A1 | 9/2018 | Di Febbo et al. |
| 2018/0315193 | A1 | 11/2018 | Paschalakis et al. |
| 2018/0336397 | A1* | 11/2018 | Smith ...................... G06V 40/16 |
| 2019/0005069 | A1* | 1/2019 | Filgueiras de Araujo .................... G06V 10/757 |
| 2019/0005670 | A1 | 1/2019 | Detone et al. |
| 2019/0108446 | A1 | 4/2019 | Lyu et al. |
| 2019/0147341 | A1 | 5/2019 | Rabinovich et al. |
| 2019/0311214 | A1* | 10/2019 | Lakemond ............. G06V 20/10 |
| 2020/0334490 | A1 | 10/2020 | Shen et al. |
| 2020/0342570 | A1* | 10/2020 | Yuan ..................... H04N 13/156 |
| 2021/0110205 | A1 | 4/2021 | Karimi et al. |
| 2021/0124901 | A1* | 4/2021 | Liu ......................... G06V 20/13 |
| 2021/0158094 | A1* | 5/2021 | Ji ........................... G06V 10/776 |
| 2021/0241114 | A1 | 8/2021 | Rabinovich et al. |
| 2021/0279508 | A1* | 9/2021 | Guo ........................ G06F 18/23 |
| 2021/0294834 | A1 | 9/2021 | Mai et al. |
| 2021/0319216 | A1 | 10/2021 | Anderson |
| 2021/0319243 | A1 | 10/2021 | Jin et al. |
| 2022/0189297 | A1* | 6/2022 | Lin ........................ G08G 1/056 |
| 2022/0292861 | A1 | 9/2022 | Ndegwa et al. |
| 2022/0335583 | A1 | 10/2022 | Xuan et al. |
| 2022/0343622 | A1 | 10/2022 | Wang et al. |
| 2022/0415007 | A1 | 12/2022 | Zhang et al. |
| 2023/0023101 | A1 | 1/2023 | Su et al. |
| 2023/0131518 | A1 | 4/2023 | An et al. |
| 2023/0146134 | A1 | 5/2023 | Selviah et al. |
| 2023/0154028 | A1* | 5/2023 | Claxton .................... G06T 7/62 382/190 |
| 2023/0169669 | A1 | 6/2023 | Kamijo et al. |
| 2023/0173546 | A1 | 6/2023 | Kishimoto et al. |
| 2023/0177340 | A1 | 6/2023 | Son et al. |
| 2023/0177650 | A1 | 6/2023 | You et al. |

FOREIGN PATENT DOCUMENTS

| | | |
|---|---|---|
| JP | 2017041113 A | 2/2017 |
| JP | 2018504219 A | 2/2018 |
| WO | 2014002554 A1 | 1/2014 |
| WO | 2017091833 A1 | 6/2017 |
| WO | 2017168899 A1 | 10/2017 |

OTHER PUBLICATIONS

U.S. Appl. No. 16/190,948, "Non-Final Office Action", Apr. 30, 2020, 18 pages.
U.S. Appl. No. 16/190,948, "Notice of Allowance", Nov. 17, 2020, 12 pages.
U.S. Appl. No. 17/179,226, "Final Office Action", Jun. 27, 2022, 18 pages.
U.S. Appl. No. 17/179,226, "Non-Final Office Action", Mar. 25, 2022, 16 pages.
U.S. Appl. No. 17/179,226, "Notice of Allowance", Sep. 9, 2022, 8 pages.
U.S. Appl. No. 17/242,251, "Notice of Allowance", Jun. 20, 2023, 11 pages.
Altwaijry et al., "Learning to Detect and Match Keypoints with Deep Architectures", British Machine Vision Conference, 2016, 12 pages.
Altwaijry et al., "Learning to Match Aerial Images with Deep Attentive Architectures", IEEE Conference on Computer Vision and Pattern Recognition, Jun. 27, 2016, pp. 3539-3547.
Au2018369757, "First Examination Report", Apr. 6, 2023, 3 pages.
Au2018369757, "Notice of Acceptance", Sep. 27, 2023, 3 pages.
Detone et al., "Deep Image Homography Estimation", Computer Science, Available Online at: https://arxiv.org/pdf/1606.03798.pdf, Jun. 13, 2016, 6 pages.
Detone et al., "Toward Geometric Deep Slam", Available Online at: https://arxiv.org/pdf/1707.07410.pdf, Jul. 24, 2017, pp. 1-14.
EP18878061.3, "Extended European Search Report", Nov. 23, 2020, 9 pages.
EP18878061.3, "Office Action", Nov. 16, 2022, 6 pages.
EP21797107.6, "Extended European Search Report", Aug. 28, 2023, 9 pages.
Feng et al., "2D3D-MatchNet: Learning to Match Keypoints Across 2D Image and 3D Point Cloud", IEEE International Conference on Robotics and Automation (ICRA), May 20, 2019, pp. 4790-4796.
IL274426, "Office Action", Dec. 18, 2022, 4 pages.
IN202047018986, "First Examination Report", Mar. 25, 2022, 7 pages.
Jahrer et al., "Learned Local Descriptors for Recognition and Matching", Computer Vision Winter Workshop, Feb. 4-6, 2008, 7 pages.
JP2020-526192, "Notice of Allowance", Mar. 29, 2023, 3 pages.
JP2020-526192, "Office Action", Dec. 16, 2022, 7 pages.
Nguyen et al., "Unsupervised Deep Homography: A Fast and Robust Homography Estimation Model", Cornell University Library, Sep. 12, 2017, 8 pages.
PCT/US2018/061048, "International Search Report and Written Opinion", Mar. 8, 2019, 10 pages.

(56) References Cited

OTHER PUBLICATIONS

PCT/US2018/061048, "Invitation to Pay Add'l Fees and Partial Search Report", Jan. 17, 2019, 2 pages.
PCT/US2021/029496, "International Preliminary Report on Patentability", Nov. 10, 2022, 10 pages.
PCT/US2021/029496, "International Search Report and Written Opinion", Jul. 27, 2021, 11 pages.
PCTUS2018061048, "International Preliminary Report on Patentability", May 28, 2020, 7 pages.
Rocco et al., "Convolutional Neural Network Architecture for Geometric Matching", IEEE Conference on Computer Vision and Pattern Recognition, 2017, pp. 6148-6157.
Yoshihara et al., "Automatic Feature Point Detection Using Deep Convolutional Networks for Quantitative Evaluation of Facial Paralysis", 9th International Congress on Image and Signal Processing, BioMedical Engineering and Informatics (CISP-BMEI), Oct. 2016, pp. 811-814.
Zheng et al., "SIFT Meets CNN: A Decade Survey of Instance Retrieval", Journal of Latex Class Files, vol. 14, No. 5, Aug. 8, 2015, pp. 1-21.
CN201880073360.0, "Office Action" and English translation, Dec. 29, 2023, 14 pages.
NZ763899, "First Examination Report", Dec. 14, 2023, 4 pages.
KR10-2020-7012922, "Office Action" and English translation, Mar. 21, 2024, 37 pages.

* cited by examiner

| Major | 2nd Major | 3rd Major | Minor |

Image Descriptor 2100

FIG. 21

IMAGE DESCRIPTOR NETWORK WITH IMPOSED HIERARCHICAL NORMALIZATION

CROSS-REFERENCES TO RELATED APPLICATIONS

This application is a continuation of U.S. patent application Ser. No. 17/242,251, filed Apr. 27, 2021, entitled "IMAGE DESCRIPTOR NETWORK WITH IMPOSED HIERARCHICAL NORMALIZATION," which is a non-provisional of and claims the benefit of and priority to U.S. Provisional Patent Application No. 63/019,211, filed May 1, 2020, entitled "IMAGE DESCRIPTOR NETWORK WITH IMPOSED HIERARCHICAL NORMALIZATION," the entire content of which is incorporated herein by reference for all purposes.

BACKGROUND OF THE INVENTION

In image processing, a descriptor of an image, also referred to as an "image descriptor", is a description of the visual features of the image, including its color, shape, texture, motion, among other possibilities. Image descriptors and the algorithms that produce them have several applications in computer vision. For example, image descriptors provide a robust means for determining the similarity between two images by, for example, generating an image descriptor for each of the images and computing a distance or difference between the two descriptors.

SUMMARY OF THE INVENTION

The present disclosure relates generally to techniques for generating image descriptors of images. More particularly, embodiments of the present disclosure provide techniques for training and using a descriptor network to accurately generate image descriptors having major and minor vectors.

A summary of the various embodiments of the invention is provided below as a list of examples. As used below, any reference to a series of examples is to be understood as a reference to each of those examples disjunctively (e.g., "Examples 1-4" is to be understood as "Examples 1, 2, 3, or 4").

Example 1 is a computer-implemented method comprising: receiving a first image; providing the first image to a descriptor network as input; generating, using the descriptor network, a first image descriptor based on the first image, the first image descriptor including a first set of elements distributed between: a first major vector comprising a first subset of the first set of elements; and a first minor vector comprising a second subset of the first set of elements, wherein the second subset of the first set of elements includes more elements than the first subset of the first set of elements; and imposing a hierarchical normalization onto the first image descriptor by: normalizing the first major vector to a major normalization amount; and normalizing the first minor vector to a minor normalization amount, wherein the minor normalization amount is less than the major normalization amount.

Example 2 is the computer-implemented method of example(s) 1, further comprising: receiving a second image; providing the second image to the descriptor network as input; generating, using the descriptor network, a second image descriptor based on the second image, the second image descriptor including a second set of elements distributed between: a second major vector comprising a first subset of the second set of elements; and a second minor vector comprising a second subset of the second set of elements, wherein the second subset of the second set of elements includes more elements than the first subset of the second set of elements; and imposing the hierarchical normalization onto the second image descriptor by: normalizing the second major vector to the major normalization amount; and normalizing the second minor vector to the minor normalization amount.

Example 3 is the computer-implemented method of example(s) 2, further comprising: determining whether the first image matches the second image by: computing a major distance between the first image and the second image based on the first major vector and the second major vector; and determining whether the major distance is greater than an upper threshold.

Example 4 is the computer-implemented method of example(s) 3, wherein determining whether the first image matches the second image further includes: determining that the major distance is greater than the upper threshold; and determining that the first image does not match the second image.

Example 5 is the computer-implemented method of example(s) 3, wherein determining whether the first image matches the second image further includes: determining that the major distance is not greater than the upper threshold; and determining whether the major distance is greater than a lower threshold.

Example 6 is the computer-implemented method of example(s) 3, wherein computing the major distance between the first image and the second image based on the first major vector and the second major vector includes: computing a sum of squares of differences between the first subset of the first set of elements and the first subset of the second set of elements.

Example 7 is the computer-implemented method of example(s) 5, wherein determining whether the first image matches the second image further includes: determining that the major distance is greater than the lower threshold; computing a minor distance between the first image and the second image based on the first minor vector and the second minor vector; and determining whether a sum of the major distance and the minor distance is greater than the upper threshold.

Example 8 is the computer-implemented method of example(s) 7, wherein determining whether the first image matches the second image further includes: determining that the sum of the major distance and the minor distance is greater than the upper threshold; and determining that the first image does not match the second image.

Example 9 is the computer-implemented method of example(s) 7, wherein determining whether the first image matches the second image further includes: determining that the sum of the major distance and the minor distance is not greater than the upper threshold; and determining that the first image matches the second image.

Example 10 is the computer-implemented method of example(s) 7, wherein computing the minor distance between the first image and the second image based on the first minor vector and the second minor vector includes: computing a sum of squares of differences between the second subset of the first set of elements and the second subset of the second set of elements.

Example 11 is the computer-implemented method of example(s) 1-10, wherein: the major normalization amount is equal to $1-\alpha$; and the minor normalization amount is equal to $\alpha$, wherein $\alpha$ is less than 0.5.

Example 12 is the computer-implemented method of example(s) 11, wherein α is equal to ⅛, 1/16, or 1/32.

Example 13 is the computer-implemented method of example(s) 1-12, wherein the descriptor network is a neural network having a set of weights that are modifiable through a training process.

Example 14 is a method of training a descriptor network, the method comprising: receiving a set of image pairs; and for each image pair of the set of image pairs: providing a first training image from the image pair to a descriptor network as input; generating, using the descriptor network, a first image descriptor based on the first training image, the first image descriptor including a first set of elements distributed between: a first major vector comprising a first subset of the first set of elements; and a first minor vector comprising a second subset of the first set of elements, wherein the second subset of the first set of elements includes more elements than the first subset of the first set of elements; and imposing a hierarchical normalization onto the first image descriptor by: normalizing the first major vector to a major normalization amount; and normalizing the first minor vector to a minor normalization amount, wherein the minor normalization amount is less than the major normalization amount; providing a second training image from the image pair to the descriptor network as input; generating, using the descriptor network, a second image descriptor based on the second training image, the second image descriptor including a second set of elements distributed between: a second major vector comprising a first subset of the second set of elements; and a second minor vector comprising a second subset of the second set of elements, wherein the second subset of the second set of elements includes more elements than the first subset of the second set of elements; and imposing the hierarchical normalization onto the second image descriptor by: normalizing the second major vector to the major normalization amount; and normalizing the second minor vector to the minor normalization amount; computing a major distance between the first training image and the second training image based on the first major vector and the second major vector; computing a minor distance between the first training image and the second training image based on the first minor vector and the second minor vector; and modifying the descriptor network based on the major distance and the minor distance.

Example 15 is a system comprising: one or more processors; and a computer-readable medium comprising instructions that, when executed by the one or more processor, cause the one or more processors to perform the methods of any of example(s)s 1-14.

Example 16 is a non-transitory machine-readable medium comprising instructions that, when executed by one or more processors, cause the one or more processors to perform the methods of any of example(s)s 1-14.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and various ways in which it may be practiced.

FIG. 21 illustrates an example image descriptor having multiple major vectors.

DETAILED DESCRIPTION OF SPECIFIC EMBODIMENTS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and various ways in which it may be practiced.

Figure 1A:
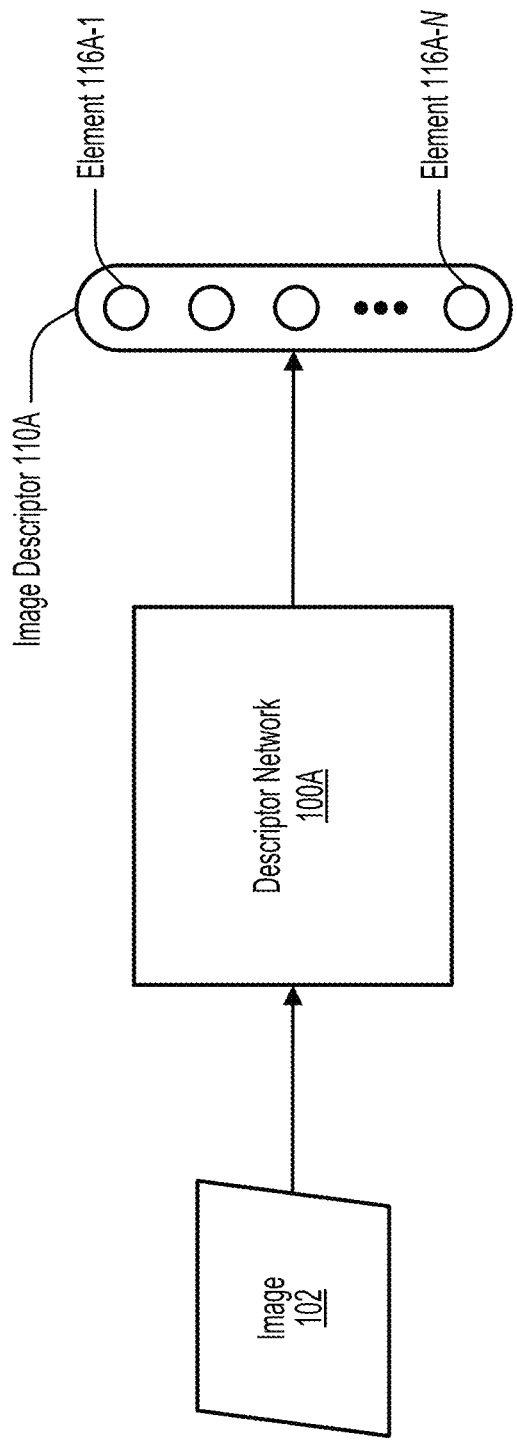
FIG. 1A illustrates an example system including a descriptor network.

FIG. 1A illustrates an example system including a descriptor network 100A for generating an image descriptor 110A based on an image 102, according to some embodiments of the present disclosure. Descriptor network 100A may be a neural network, such as a convolutional neural network, having a particular architecture and an associated set of weights. When image 102 is provided as input, descriptor network 100A may be configured to generate image descriptor 110A having N elements 116A. Each of elements 116A may be indicative of the visual features in image 102.

Figure 1B:
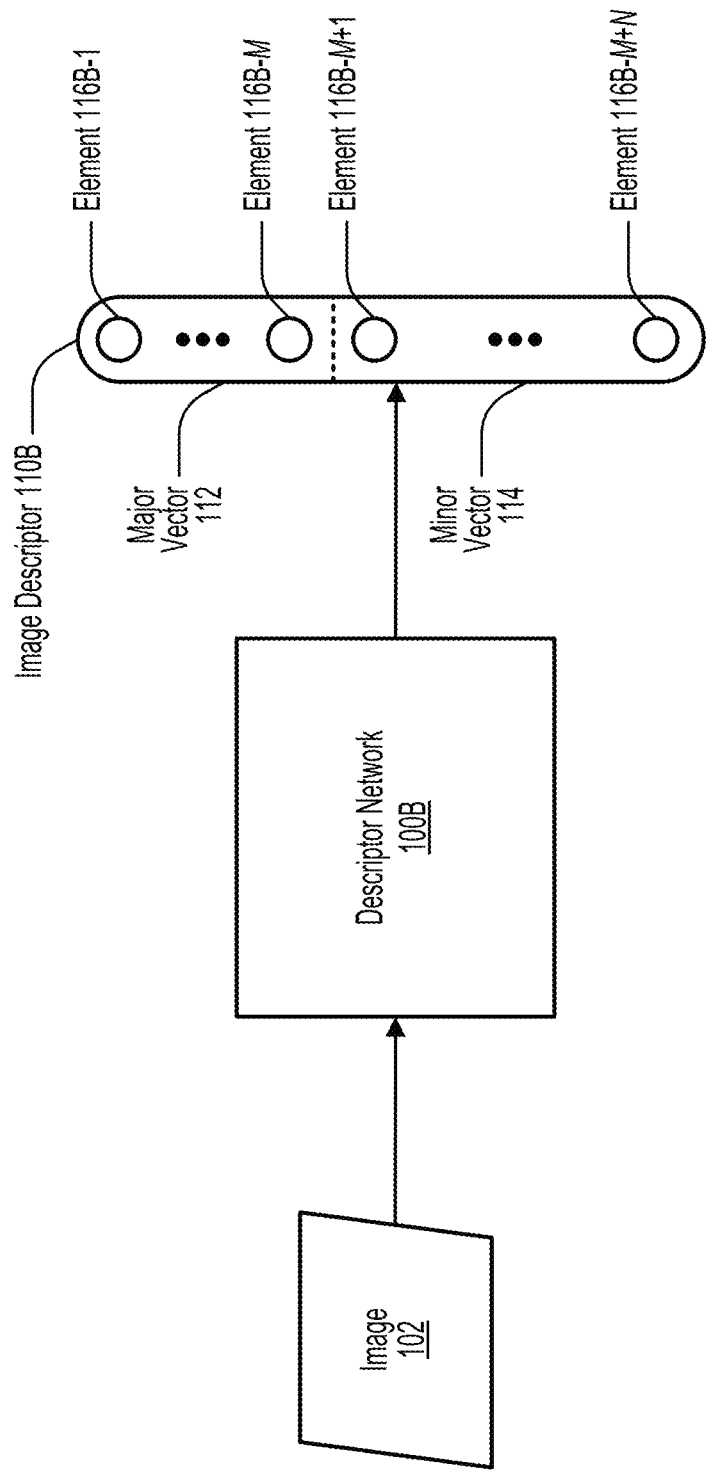
FIG. 1B illustrates an example system including a descriptor network.

FIG. 1B illustrates an example system including a descriptor network 100B similar to descriptor network 100A except that the generated image descriptor 110B includes a major vector 112 and a minor vector 114. In some embodiments, major vector 112 may include a first subset of elements 116B (from element 116B-1 to element 116B M) and minor vector 114 may include a second subset of elements 116B (from element 116B-M+1 to element 116B-M+N). Thus, the first subset may include M elements and the second subset may include N elements.

In some embodiments, major vector 112 and minor vector 114 are obtained by imposing a hierarchical normalization onto image descriptor 110B. This may include normalizing major vector 112 to a major normalization amount and minor vector 114 to a minor normalization amount, where the major normalization amount is greater than the minor normalization amount. By imposing the hierarchical normalization in conjunction with setting the size of major vector 112 (M) to be less than the size of minor vector 114 (N), image descriptor 110B can be used in such a way to significantly improve performance in various tasks, as described herein.

Figure 2:
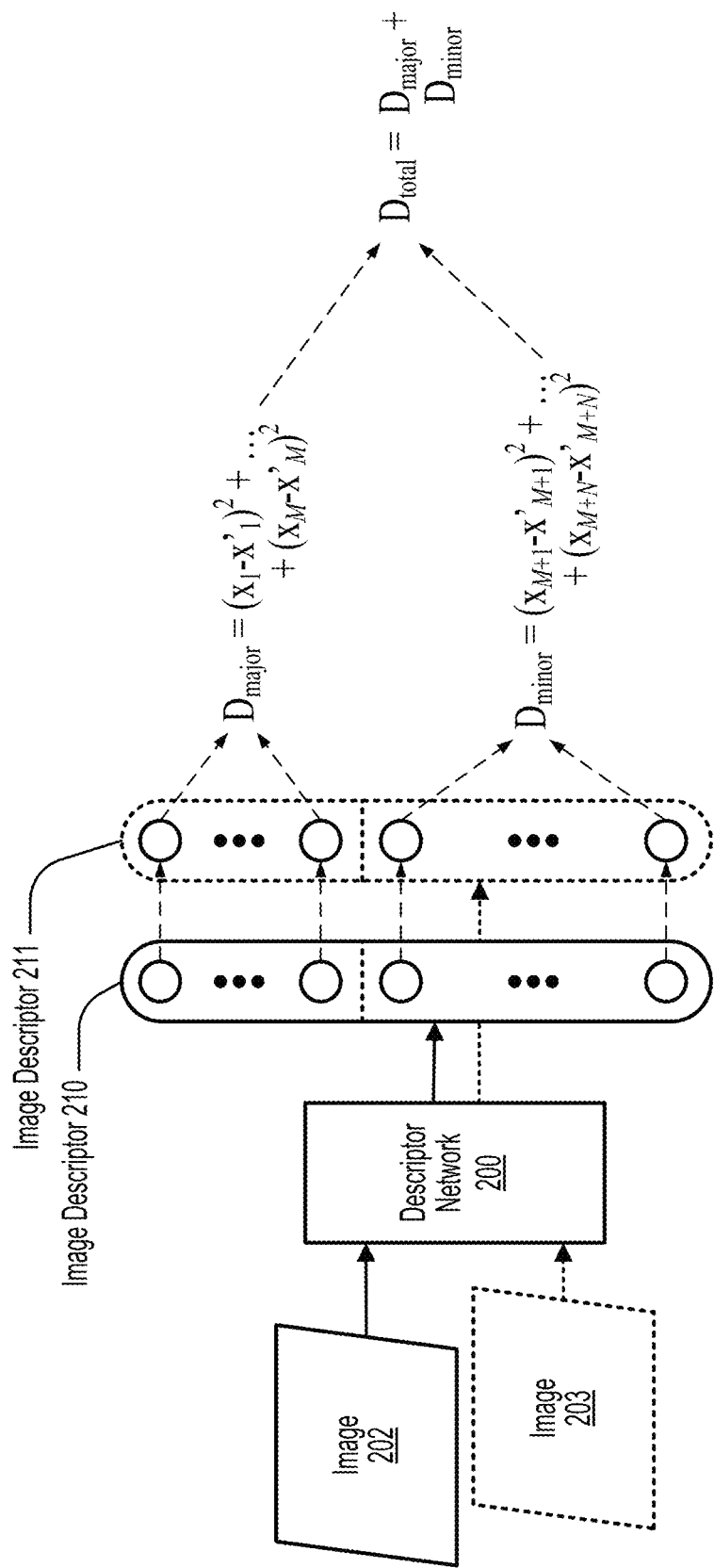
FIG. 2 illustrates an example system including a descriptor network.

FIG. 2 illustrates an example system including a descriptor network 200, according to some embodiments of the present disclosure. In the illustrated example, descriptor network 200 is used to determine the similarity between images 202 and 203 by determining the distance between image descriptors 210 and 211 generated based on images 202 and 203, respectively. Descriptor network 200 may be similar to descriptor network 100B such that image descriptors 210 and 211 each include a major vector and a minor vector. In various embodiments, images 202 and 203 may be provided as input to descriptor network 200 sequentially (e.g., image 202 may be provided at a first time and image 203 may be provided at a second time after the first time) or may be provided simultaneously to two different instances of descriptor network 200 (e.g., the instructions for implementing the model architecture and weights associated with descriptor network 200 may be loaded onto two separate processors or processor cores).

The total distance $D_{total}$ between image descriptors 210 and 211 may be computed as the sum of the major distance $D_{major}$ between the image descriptors (the portion of the total distance $D_{total}$ computed based on only the major vectors of image descriptors 210 and 211) and the minor distance $D_{minor}$ between the image descriptors (the portion of the total distance $D_{total}$ computed based on only the minor vectors of image descriptors 210 and 211). In the illustrated example, the Euclidean distance is used to calculate the major distance based on the elements of the major vector of image descriptor 210 ($x_1, x_2, \ldots, x_M$) and the major vector of image descriptor 211 ($x'_1, x'_2, \ldots, x'_M$) and the minor distance based on the elements of the minor vector of image descriptor 210 ($x_{M+1}, x_{M+2}, \ldots, x_{M+N}$) and the minor vector of image descriptor 211 ($x'_{M+1}, x'_{M+2}, \ldots, x'_{M+N}$). Other distance metrics, such as cosine distance, may be used to calculate the major distance and the minor distance.

Figure 3A:
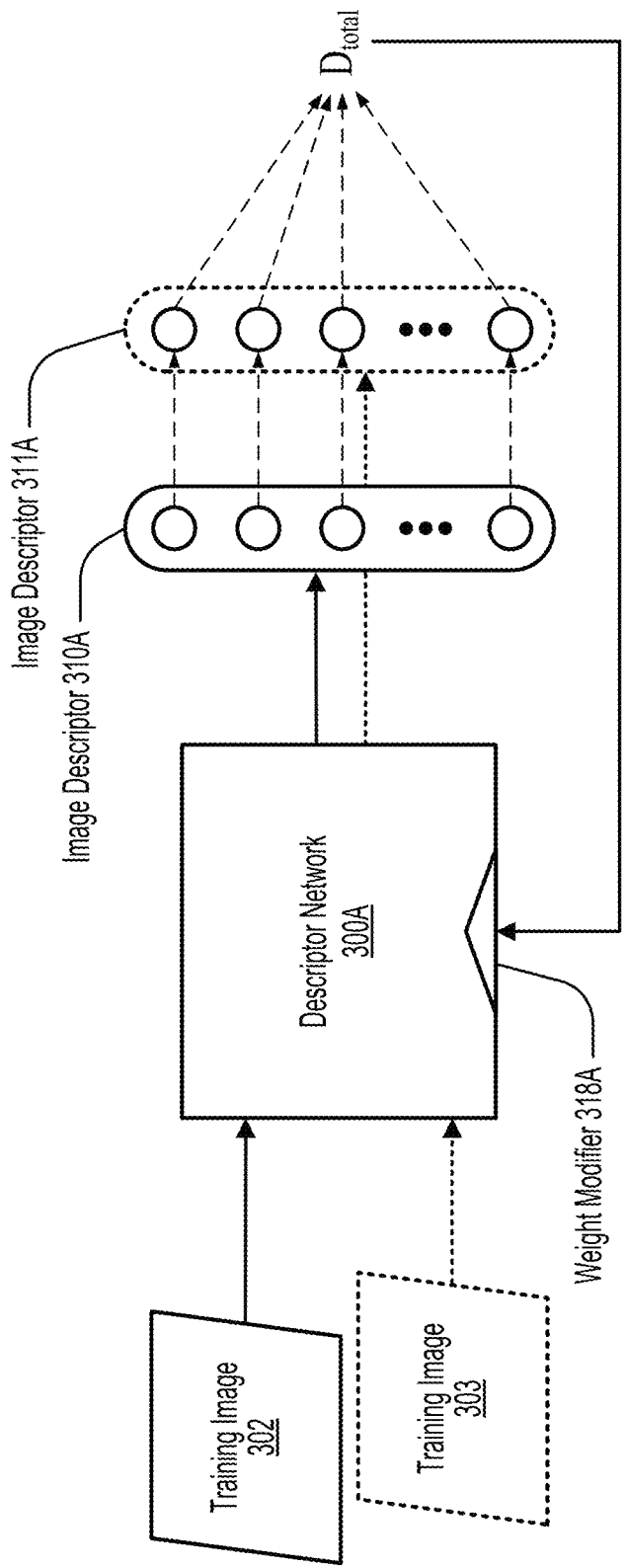
FIG. 3A illustrates an example system for training a descriptor network.

FIG. 3A illustrates an example system for training a descriptor network 300A, according to some embodiments of the present disclosure. Descriptor network 300A may be similar to descriptor network 100A. During a single training iteration of multiple training iterations, descriptor network 300A may be provided with training images 302 and 303. In some embodiments, training images 302 and 303 may be known to be similar or dissimilar images. For example, training image 303 may be a slightly modified version of training image 302. When training images 302 and 303 are provided as input (e.g., sequentially), descriptor network 300A may be configured to generate image descriptors 310A and 311A, respectively. A total distance $D_{total}$ may then be computed based on image descriptors 310A and 311A.

The total distance $D_{total}$ may be used to train descriptor network 300A by, for example, modifying the weights of descriptor network 300A. In some embodiments, the weights of descriptor network 300A may be modified to increase or decrease the total distance $D_{total}$ toward a desired value. For example, if training images 302 and 303 are known to be similar images, the weights of descriptor network 300A may be modified to cause the total distance $D_{total}$ to decrease toward zero. As another example, if training images 302 and 303 are known to be dissimilar images, the weights of descriptor network 300A may be modified to cause the total distance $D_{total}$ to increase toward one. In some embodiments, the weights of descriptor network 300A may be modified using weight modifier 318A which may employ, for example, a back propagation technique to adjust weights.

Figure 3B:
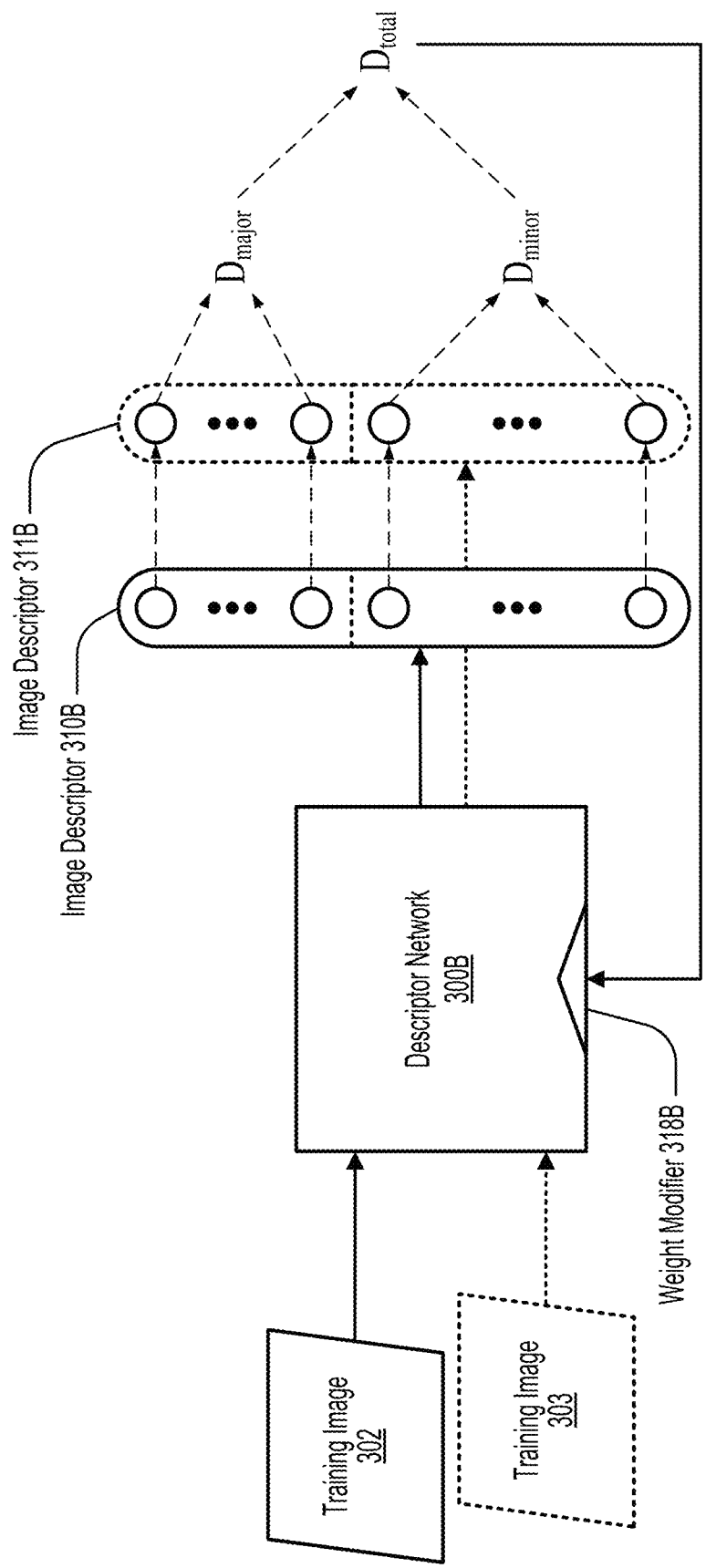
FIG. 3B illustrates an example system for training a descriptor network.

FIG. 3B illustrates an example system for training a descriptor network 300B, according to some embodiments of the present disclosure. Descriptor network 300B may be similar to descriptor network 100B. Similar to that described in FIG. 3A, during a single training iteration of multiple training iterations, descriptor network 300B may be provided with training images 302 and 303. When training images 302 and 303 are provided as input (e.g., sequentially), descriptor network 300B may generate image descriptors 310B and 311B each having a major vector and a minor vector. A total distance $D_{total}$ may then be computed based on image descriptors 310B and 311B.

Similar to that described in FIG. 3A, the total distance $D_{total}$ may be used to train descriptor network 300B by, for example, modifying the weights of descriptor network 300B. In some embodiments, the weights of descriptor network 300B may be modified to increase or decrease the total distance $D_{total}$ toward a desired value. For example, if training images 302 and 303 are known to be similar images, the weights of descriptor network 300B may be modified to cause the total distance $D_{total}$ to decrease toward zero. As another example, if training images 302 and 303 are known to be dissimilar images, the weights of descriptor network 300B may be modified to cause the total distance $D_{total}$ to increase toward one. In some embodiments, the weights of descriptor network 300B may be modified using weight modifier 318B which may employ, for example, a back propagation technique to adjust weights.

Figure 4:
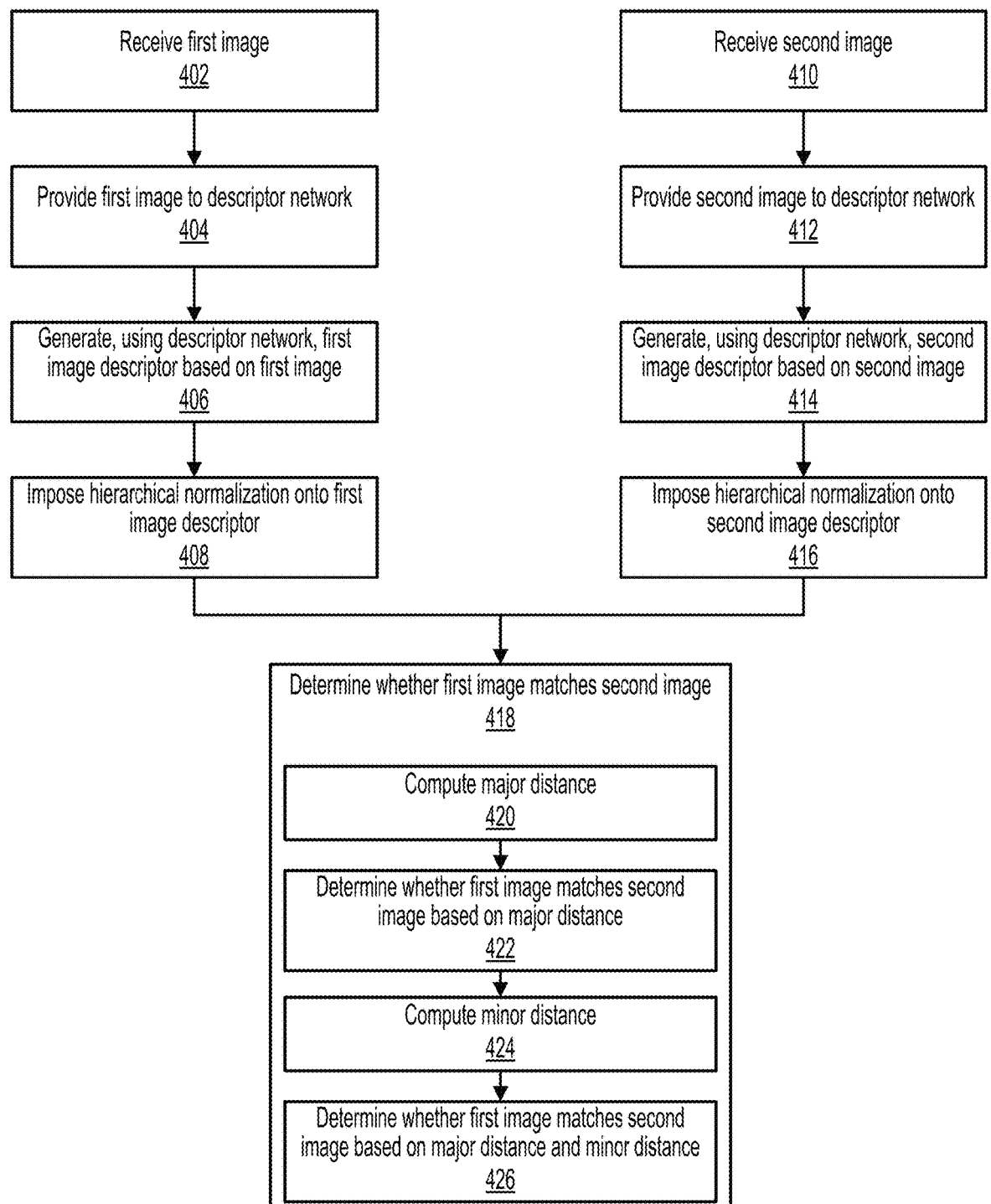
FIG. 4 illustrates a method of using a descriptor network.

FIG. 4 illustrates a method 400 of using a descriptor network (e.g., descriptor networks 100A, 100B, 200, 300A, 300B), according to some embodiments of the present disclosure. One or more steps of method 400 may be omitted during performance of method 400, and steps of method 400 need not be performed in the order shown. One or more steps of method 400 may be performed by one or more processors. Method 400 may be implemented as a computer-readable medium or computer program product comprising instructions which, when the program is executed by one or more computers, cause the one or more computers to carry out the steps of method 400. Such computer program products can be transmitted, over a wired or wireless network, in a data carrier signal carrying the computer program product.

At step 402, a first image (e.g., images 102, 202, 203, 302, 303) is received. The first image may be a grayscale image, a multi-channel image (e.g., RGB image), among other possibilities. The first image may be an original image or a portion of an original image.

At step 404, the first image is provided to the descriptor network.

At step 406, the descriptor network generates a first image descriptor (e.g., image descriptors 110A, 110B, 210, 211, 310A, 311A, 310B, 311B) based on the first image. The first image descriptor may include a first set of elements. The first image descriptor may include a first major vector (e.g., major vector 112) that includes a first subset of the first set of elements and a first minor vector (e.g., minor vector 114) that includes a second subset of the first set of elements. In some embodiments, the second subset of the first set of elements includes more elements than the first subset of the first set of elements (e.g., N>M).

At step 408, a hierarchical normalization is imposed onto the first image descriptor. In some embodiments, imposing the hierarchical normalization onto the first image descriptor may include normalizing the first major vector of the first image descriptor to a major normalization amount and normalizing the first minor vector of the first image descriptor to a minor normalization amount.

At step 410, a second image (e.g., images 102, 202, 203, 302, 303) is received. The second image may be a grayscale image, a multi-channel image (e.g., RGB image), among other possibilities. The second image may be an original image or a portion of an original image.

At step 412, the second image is provided to the descriptor network.

At step 414, the descriptor network generates a second image descriptor (e.g., image descriptors 110A, 110B, 210, 211, 310A, 311A, 310B, 311B) based on the second image. The second image descriptor may include a second set of elements. The second image descriptor may include a second major vector (e.g., major vector 112) that includes a first subset of the second set of elements and a second minor vector (e.g., minor vector 114) that includes a second subset of the second set of elements. In some embodiments, the second subset of the second set of elements includes more elements than the first subset of the second set of elements (e.g., N>M).

At step 416, a hierarchical normalization is imposed onto the second image descriptor. In some embodiments, imposing the hierarchical normalization onto the second image descriptor may include normalizing the second major vector of the second image descriptor to the major normalization amount and normalizing the second minor vector of the second image descriptor to the minor normalization amount.

At step 418, it is determined whether the first image matches the second image based on the first image descriptor and the second image descriptor. In some embodiments, step 418 includes one or more of steps 420 to 426.

At step 420, a major distance between the first image and the second image is computed based on the first major vector and the second major vector. In some embodiments, computing the major distance includes computing the Euclidean distance and/or the Cosine distance between the first major vector and the second major vector. In some embodiments, computing the major distance includes computing a sum of squares of differences between the first subset of the first set of elements and the first subset of the second set of elements.

At step 422, it is determined whether the first image matches the second image based on the major distance. In some embodiments, determining that the first image matches the second image includes determining that the major distance is greater than an upper threshold. In some embodiments, determining that the first image does not match the second image includes determining that the major distance is less than a lower threshold.

In some embodiments, if any determination is made as to whether the images do or do not match at step 422, method 400 ends. In some embodiments, it may not be possible to determine whether the first image matches the second image based on the major distance alone (e.g., the major distance is between the upper threshold and the lower threshold). In such embodiments, method 400 proceeds to step 424 and the minor distance is computed.

At step 424, a minor distance between the first image and the second image is computed based on the first minor vector and the second minor vector. In some embodiments, computing the minor distance includes computing the Euclidean distance and/or the Cosine distance between the first minor vector and the second minor vector. In some embodiments, computing the minor distance includes computing a sum of squares of differences between the second subset of the first set of elements and the second subset of the second set of elements.

At step 426, it is determined whether the first image matches the second image based on the major distance and the minor distance. In some embodiments, a sum (or a total distance) of the major distance and the minor distance is computed. In some embodiments, determining that the first image matches the second image includes determining that the sum of the major distance and the minor distance is greater than the upper threshold. In some embodiments, determining that the first image does not match the second image includes determining that the sum of the major distance and the minor distance is less than the upper threshold.

Figure 5:
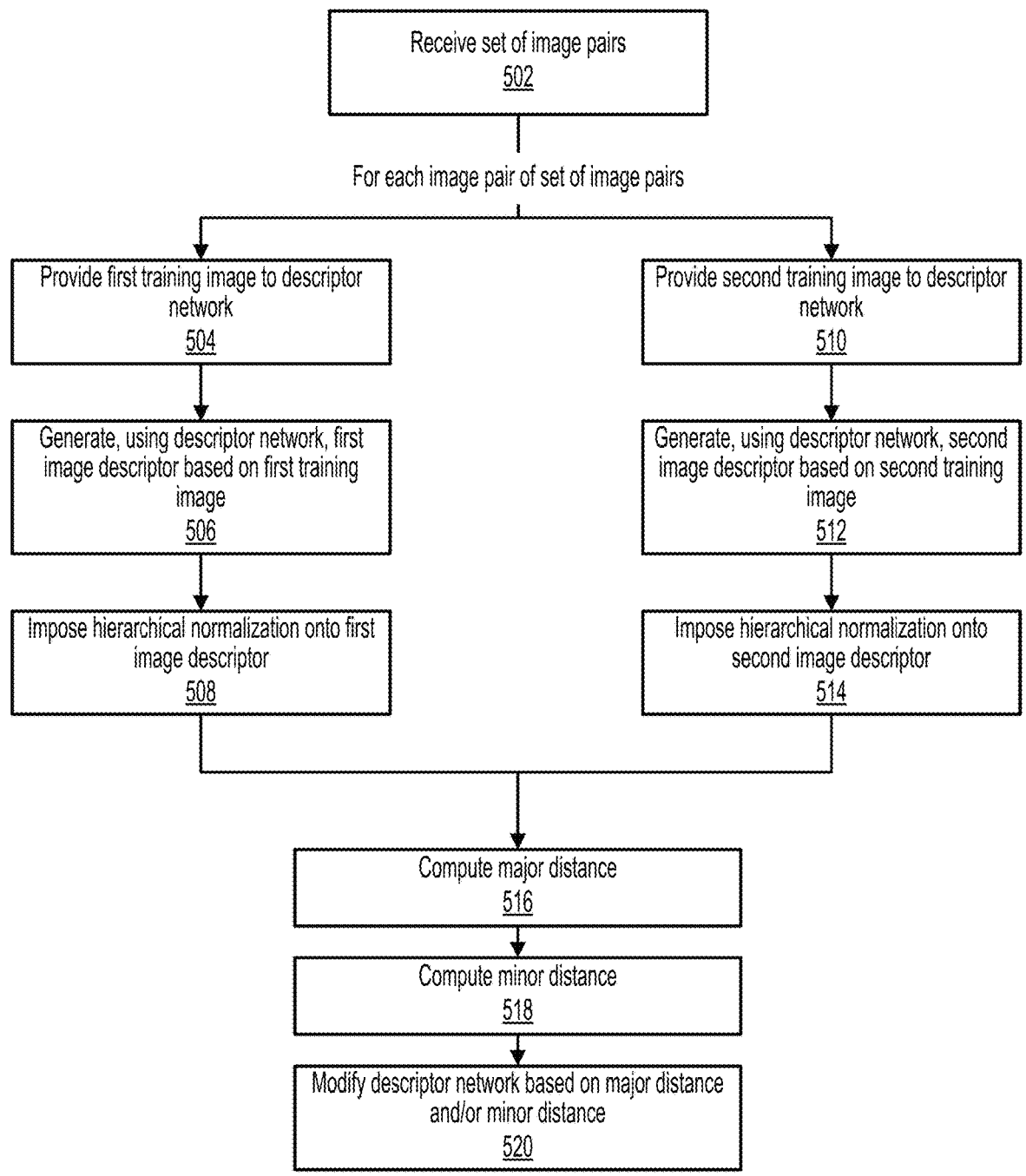
FIG. 5 illustrates a method of training a descriptor network.

FIG. 5 illustrates a method 500 of training a descriptor network (e.g., descriptor networks 100A, 100B, 200, 300A, 300B), according to some embodiments of the present disclosure. One or more steps of method 500 may be omitted during performance of method 500, and steps of method 500 need not be performed in the order shown. One or more steps of method 500 may be performed by one or more processors. Method 500 may be implemented as a computer-readable medium or computer program product comprising instructions which, when the program is executed by one or more computers, cause the one or more computers to carry out the steps of method 500. Such computer program products can be transmitted, over a wired or wireless network, in a data carrier signal carrying the computer program product.

At step 502, a set of image pairs (e.g., images 202, 203, 302, 303) are received. In various embodiments, the set of image pairs may include 10 image pairs, 1,000 image pairs, 1,000,000 image pairs, among other possibilities, depending on the size of the training dataset. Each image in each image pair of the set of image pairs may be a grayscale image, a multi-channel image (e.g., RGB image), among other possibilities. Each image may be an original image or a portion of an original image.

In some embodiments, steps 504 to 520 are performed for each image pair of the set of image pairs. At step 504, a first training image from the image pair is provided to the descriptor network.

At step 506, the descriptor network generates a first image descriptor (e.g., image descriptors 110A, 110B, 210, 211, 310A, 311A, 310B, 311B) based on the first training image. The first image descriptor may include a first set of elements. The first image descriptor may include a first major vector (e.g., major vector 112) that includes a first subset of the first set of elements and a first minor vector (e.g., minor vector 114) that includes a second subset of the first set of elements. In some embodiments, the second subset of the first set of elements includes more elements than the first subset of the first set of elements (e.g., N>M).

At step 508, a hierarchical normalization is imposed onto the first image descriptor. In some embodiments, imposing the hierarchical normalization onto the first image descriptor may include normalizing the first major vector of the first image descriptor to a major normalization amount and normalizing the first minor vector of the first image descriptor to a minor normalization amount.

At step 510, a second training image from the image pair is provided to the descriptor network.

At step 512, the descriptor network generates a second image descriptor (e.g., image descriptors 110A, 110B, 210, 211, 310A, 311A, 310B, 311B) based on the second training image. The second image descriptor may include a second set of elements. The second image descriptor may include a second major vector (e.g., major vector 112) that includes a first subset of the second set of elements and a second minor vector (e.g., minor vector 114) that includes a second subset of the second set of elements. In some embodiments, the second subset of the second set of elements includes more elements than the first subset of the second set of elements (e.g., N>M).

At step 514, a hierarchical normalization is imposed onto the second image descriptor. In some embodiments, imposing the hierarchical normalization onto the second image descriptor may include normalizing the second major vector of the second image descriptor to a major normalization amount and normalizing the second minor vector of the second image descriptor to a minor normalization amount.

At step 516, a major distance between the first image and the second image is computed based on the first major vector and the second major vector, similar to step 420. In some embodiments, it is determined whether the first training image matches the second training image based on the major distance.

At step 518, a minor distance between the first image and the second image is computed based on the first minor vector and the second minor vector, similar to step 424. In some embodiments, it is determined whether the first training image matches the second training image based on the minor distance.

At step 520, the descriptor network is modified based on the major distance and/or the minor distance. In some embodiments, the weights of the descriptor network are modified so as to increase or decrease the major distance and/or the minor distance (e.g., the sum of the distances) when the same image pair is provided to the descriptor network as input. The weights of the descriptor network may be modified by a weight modifier (e.g., weight modifiers 318A, 318B) that may perform a back propagation technique to adjust the weights of the descriptor network.

In some embodiments, the descriptor network may be trained sequentially by first training for the major vector and subsequently training for the minor vector. For example, the weights of the descriptor network that contribute to computing the elements of the major vector may be trained using a set of image pairs while ignoring the elements of the minor vector. Once trained, the weights of the descriptor network that contribute to computing the elements of the major vector may be fixed. Thereafter, the weights of the descriptor network that contribute to computing the elements of the minor vector may be trained using the same set of image pairs or a different set of image pairs. In some embodiments, the elements of the major vector may be ignored while training the elements of the minor vector. In some embodiments, both the major vector and the minor vector may be considered while training the weights of the descriptor network that contribute to computing the elements of the minor vector. In some embodiments, the weights of the descriptor network that contribute to computing the elements of the major vector and the minor vector may be trained simultaneously.

Figure 6:
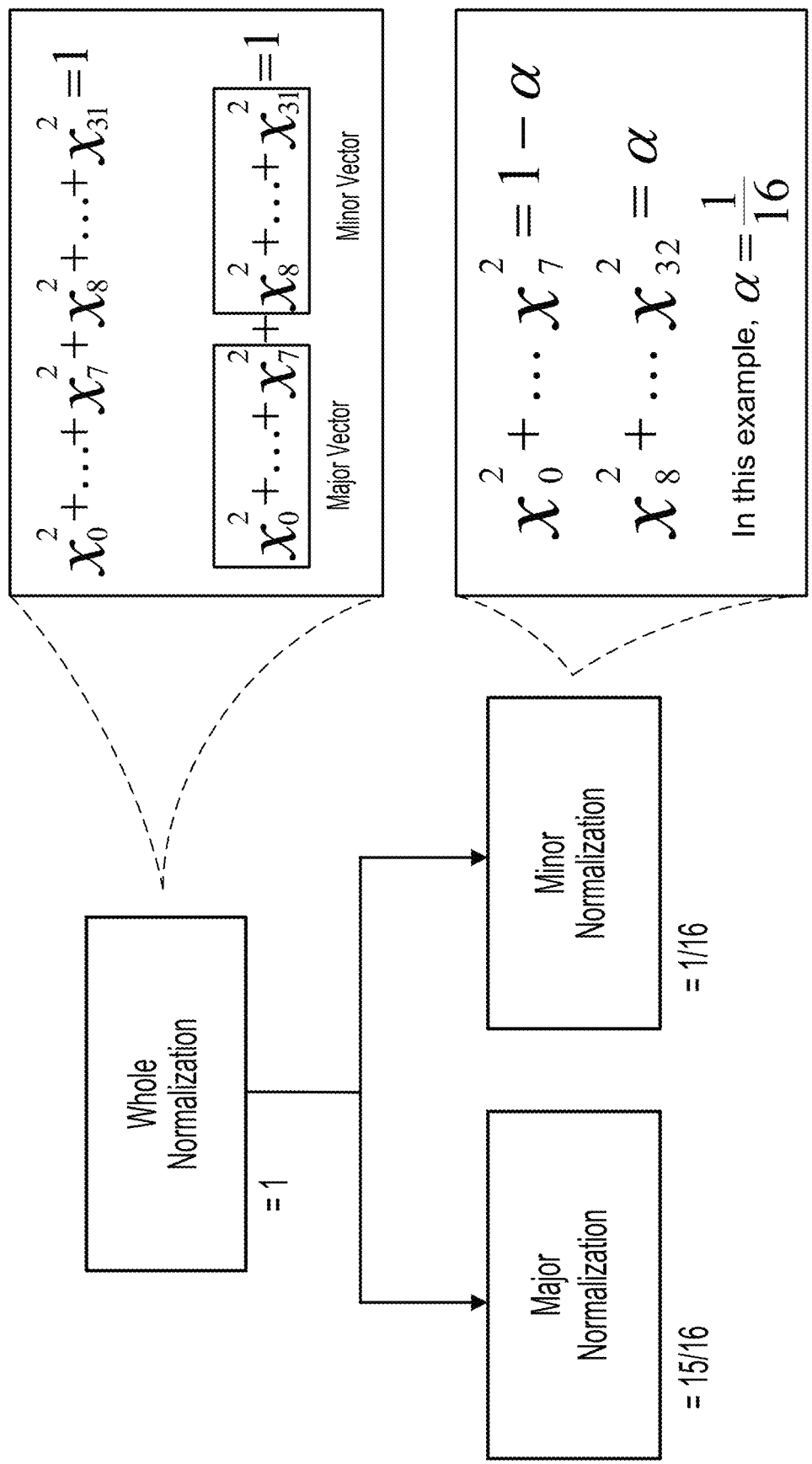
FIG. 6 illustrates an example of a hierarchical normalization.

FIG. 6 illustrates an example of a hierarchical normalization, according to some embodiments of the present disclosure. Instead of normalizing all of the elements to a value of 1, the elements are divided into a major vector and a minor vector, and all of the elements in the major vector are normalized to a value of $1-\alpha$ and all of the elements in the minor vector are normalized to a value of $\alpha$. In the illustrated example, $\alpha$ is equal to $1/16$. Thus, the major vector is normalized to $15/16$ and the minor vector is normalized to $1/16$. In the illustrated example, the major vector includes 8 elements and the minor vector includes 24 elements.

Figure 7:
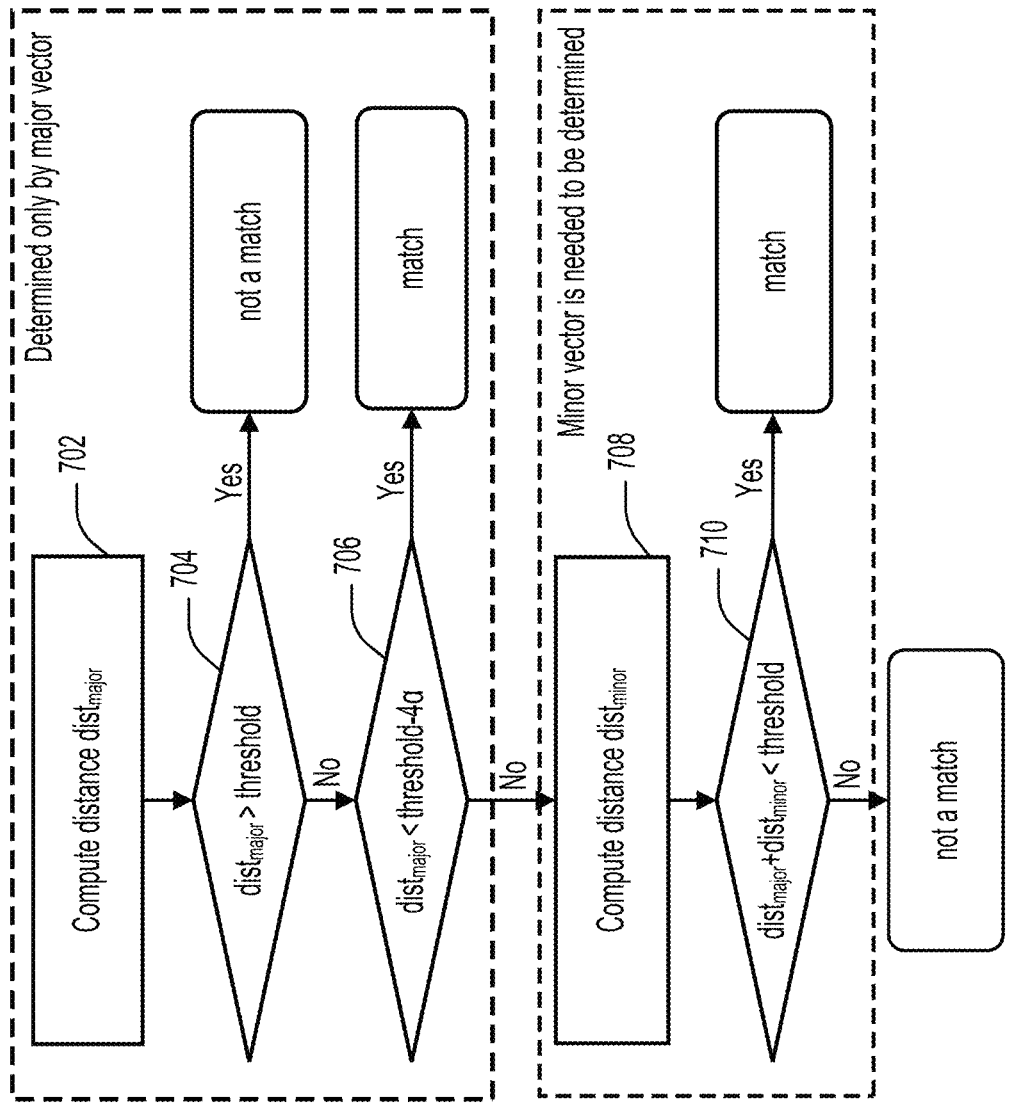
FIG. 7 illustrates an example flowchart showing a method for determining whether two images match.

FIG. 7 illustrates an example flowchart showing a method of determining whether two images match, according to some embodiments of the present disclosure. In the illustrated example, the Euclidean distance is used to compute the major distance and the minor distance. At step 702, the major distance is computed. At step 704, it is determined whether the major distance is greater than an upper threshold. If the major distance is greater than the upper threshold, then it is determined that the images do not match. Otherwise, the method proceeds to step 706. At step 706, it is determined whether the major distance is less than a lower threshold (equal to the upper threshold$-4\alpha$). If the major distance is less than the lower threshold, then it is determined that the images match. Otherwise, the method proceeds to step 708.

At step 708, the minor distance is computed. At step 710, it is determined whether the sum of the major distance and the minor distance is less than the upper threshold. If the sum of the major distance and the minor distance is less than the upper threshold, then it is determined that the images match. Otherwise (e.g., if the sum of the major distance and the minor distance is greater than the upper threshold), it is determined that the images do not match.

Figure 8:
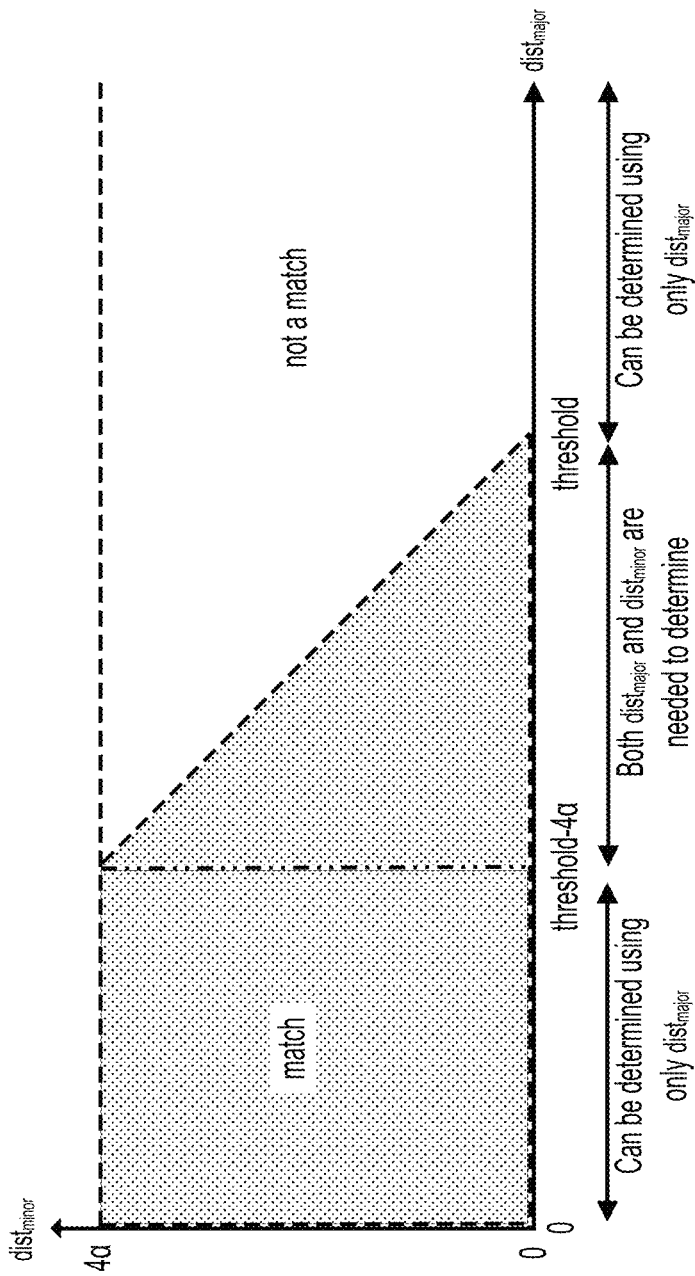
FIG. 8 illustrates a graphical representation of the example flowchart illustrated in FIG. 7.

FIG. 8 illustrates a graphical representation of the example flowchart illustrated in FIG. 7, according to some embodiments of the present disclosure. As shown in FIG. 8, a match can be determined based on the major distance alone when the major distance is greater than the upper threshold or when the major distance is less than the lower threshold. Otherwise, a match is determined based on both the major distance and the minor distance.

Figure 9:
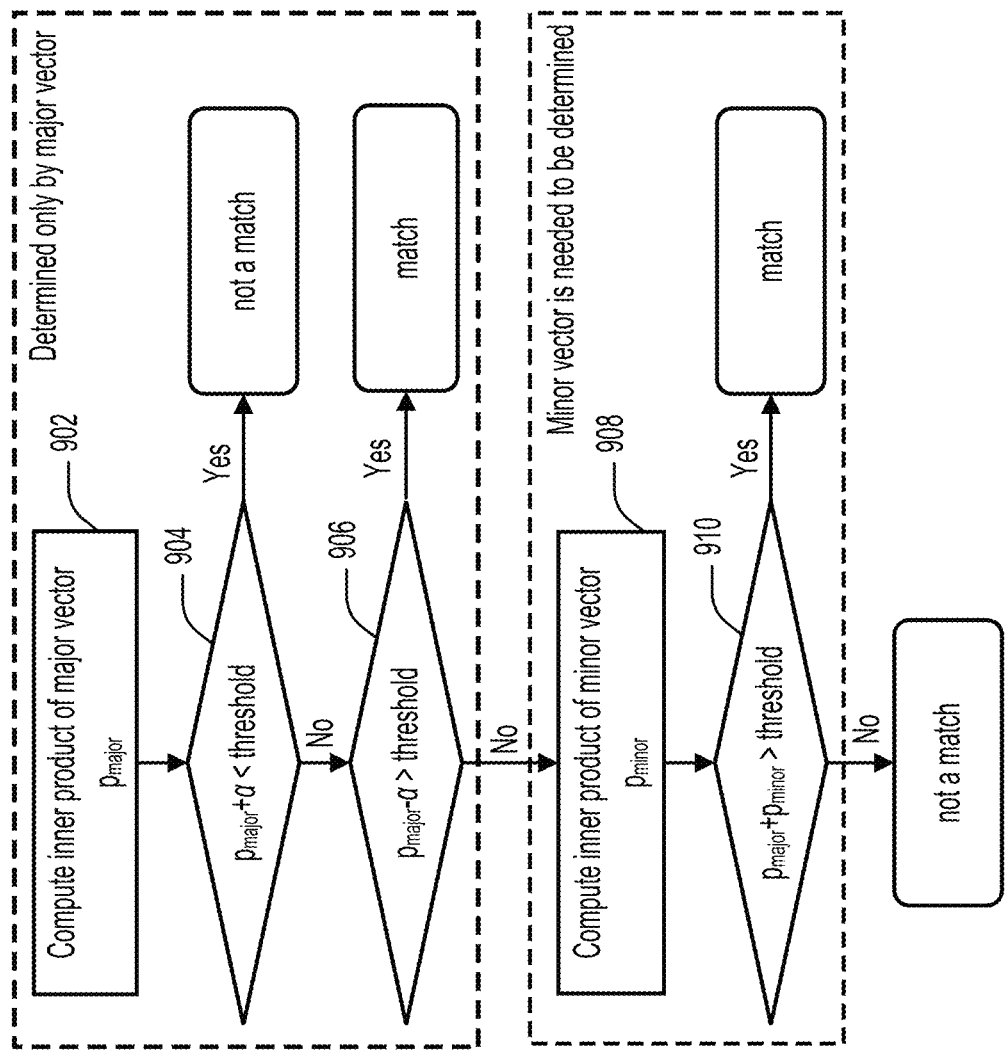
FIG. 9 illustrates an example flowchart showing a method for determining whether two images match.

FIG. 9 illustrates an example flowchart showing a method of determining whether two images match, according to some embodiments of the present disclosure. In the illustrated example, the Cosine distance is used to compute the major distance and the minor distance. At step 902, the major distance is computed by computing the inner product between the major vectors of the two images. At step 904, it is determined whether the major distance is less than a lower threshold. If the major distance is less than the lower threshold, then it is determined that the images do not match. Otherwise, the method proceeds to step 906. At step 906, it is determined whether the major distance is greater than an upper threshold (equal to the lower threshold$+2\alpha$). If the major distance is greater than the upper threshold, then it is determined that the images match. Otherwise, the method proceeds to step 908.

At step 908, the minor distance is computed by computing the inner product between the minor vectors of the two images. At step 910, it is determined whether the sum of the major distance and the minor distance is greater than a middle threshold (equal to the average between the upper threshold and the lower threshold). If the sum of the major distance and the minor distance is greater than the middle threshold, then it is determined that the images match. Otherwise (e.g., if the sum of the major distance and the minor distance is less than the middle threshold), it is determined that the images do not match.

Figure 10:
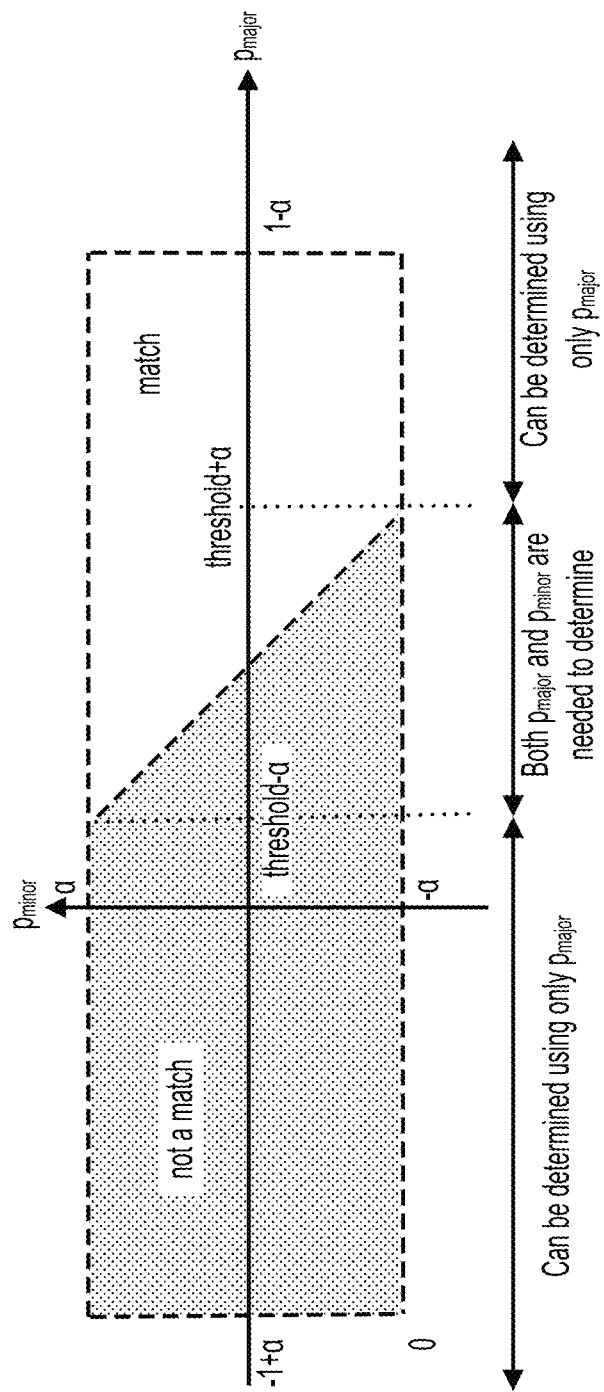
FIG. 10 illustrates a graphical representation of the example flowchart illustrated in FIG. 9.

FIG. 10 illustrates a graphical representation of the example flowchart illustrated in FIG. 9, according to some embodiments of the present disclosure. As shown in FIG. 10, a match can be determined based on the major distance alone when the major distance is greater than the upper threshold or when the major distance is less than the lower threshold. Otherwise, a match is determined based on both the major distance and the minor distance.

Figure 11:
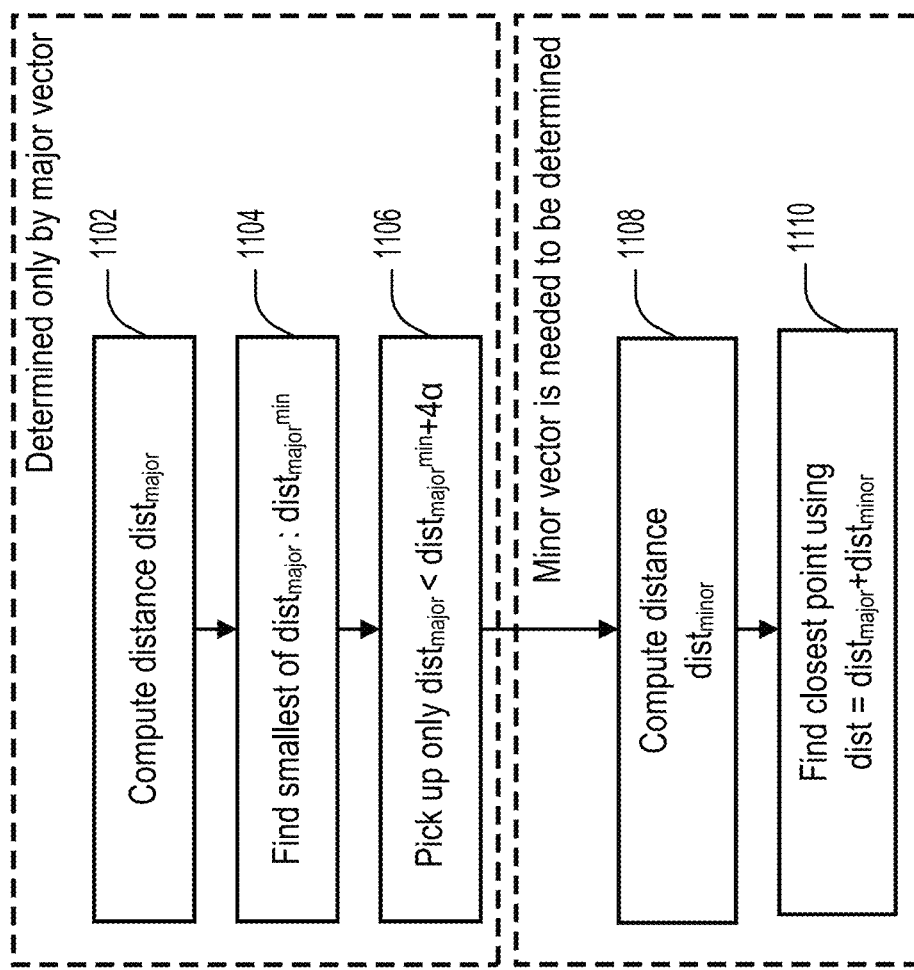
FIG. 11 illustrates an example flowchart showing a method for finding a closest image from a set of images to a reference image.

FIG. 11 illustrates an example flowchart showing a method for finding a closest image from a set of images to a reference image, according to some embodiments of the present disclosure. In the illustrated example, the Euclidean distance is used to compute the major distance and the minor distance. After the major vectors of the image descriptors are generated for the set of images as well as the reference image, at step 1102, the major distance is computed between each of the set of images and the reference image using the major vectors. At step 1104, the minimum major distance is identified. At step 1106, all images having a major distance less than the minimum distance+4α are selected.

At step 1108, after the minor vectors of the image descriptors are generated for the selected images as well as the reference image, the minor distance is computed between each of the selected images and the reference image using the minor vectors. At step 1110, the closest image is selected by identifying the minimum total distance, which is the sum of the major distance and the minor distance.

Figure 12:
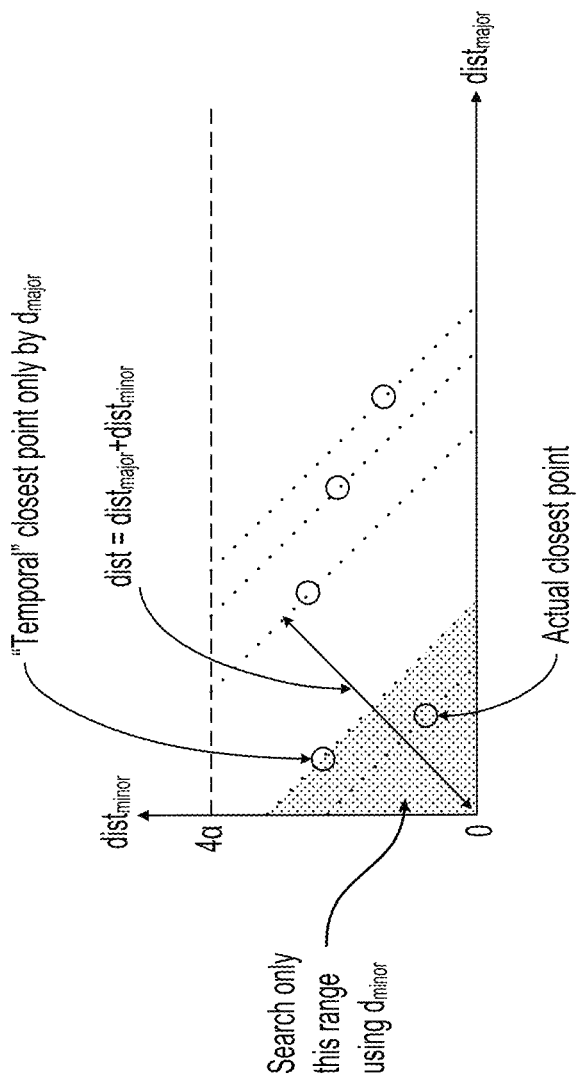
FIG. 12 illustrates a graphical representation of the example flowchart illustrated in FIG. 11.

FIG. 12 illustrates a graphical representation of the example flowchart illustrated in FIG. 11, according to some embodiments of the present disclosure. As shown in FIG. 12, only a small region needs to be searched using the minor distance when the major distance is used to filter out images having a major distance above a threshold.

Figure 13:
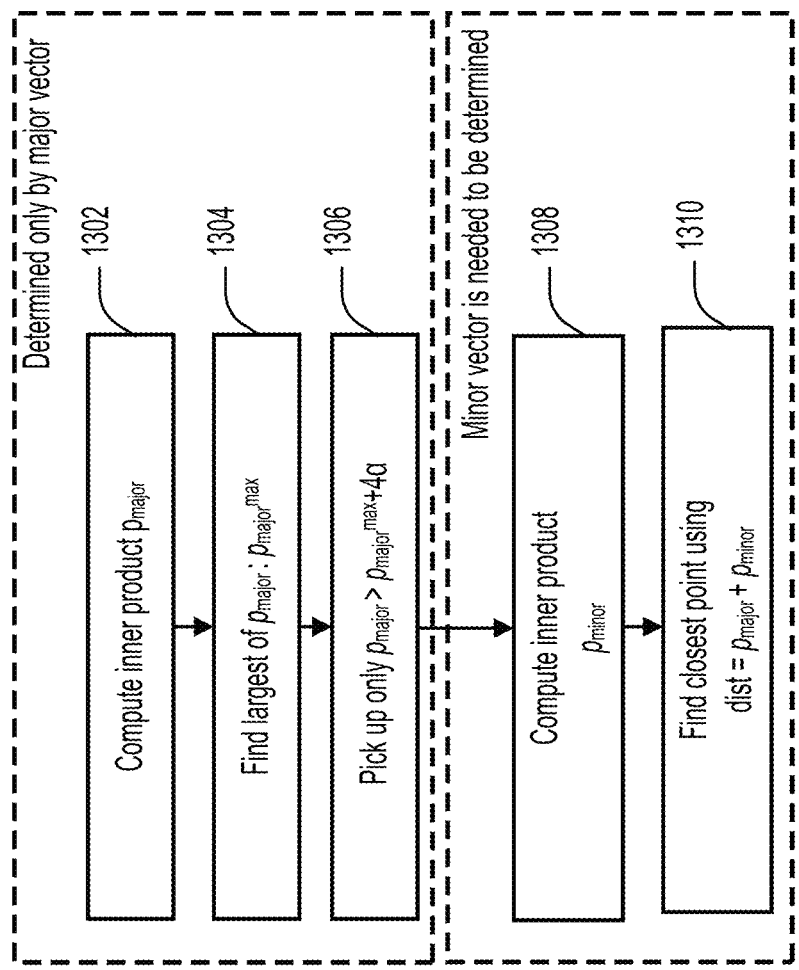
FIG. 13 illustrates an example flowchart showing a method for finding a closest image from a set of images to a reference image.

FIG. 13 illustrates an example flowchart showing a method for finding a closest image from a set of images to a reference image, according to some embodiments of the present disclosure. In the illustrated example, the Cosine distance is used to compute the major distance and the minor distance. After the major vectors of the image descriptors are generated for the set of images as well as the reference image, at step 1302, the major distance is computed between each of the set of images and the reference image using the major vectors by computing inner products. At step 1304, the maximum major distance is identified. At step 1306, all images having a major distance greater than the maximum distance−α are selected.

At step 1308, after the minor vectors of the image descriptors are generated for the selected images as well as the reference image, the minor distance is computed between each of the selected images and the reference image using the minor vectors by computing inner products. At step 1310, the closest image is selected by identifying the maximum total distance, which is the sum of the major distance and the minor distance.

Figure 14:
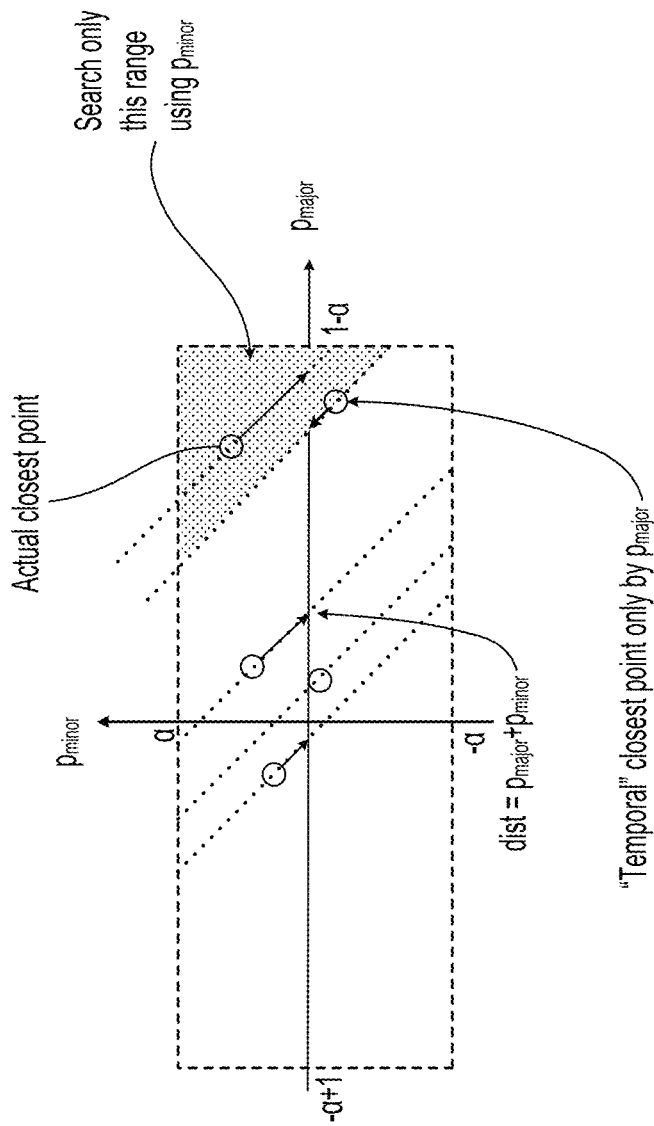
FIG. 14 illustrates a graphical representation of the example flowchart illustrated in FIG. 13.

FIG. 14 illustrates a graphical representation of the example flowchart illustrated in FIG. 13, according to some embodiments of the present disclosure. As shown in FIG. 14, only a small region needs to be searched using the minor distance when the major distance is used to filter out images having a major distance below a threshold.

Figure 15:
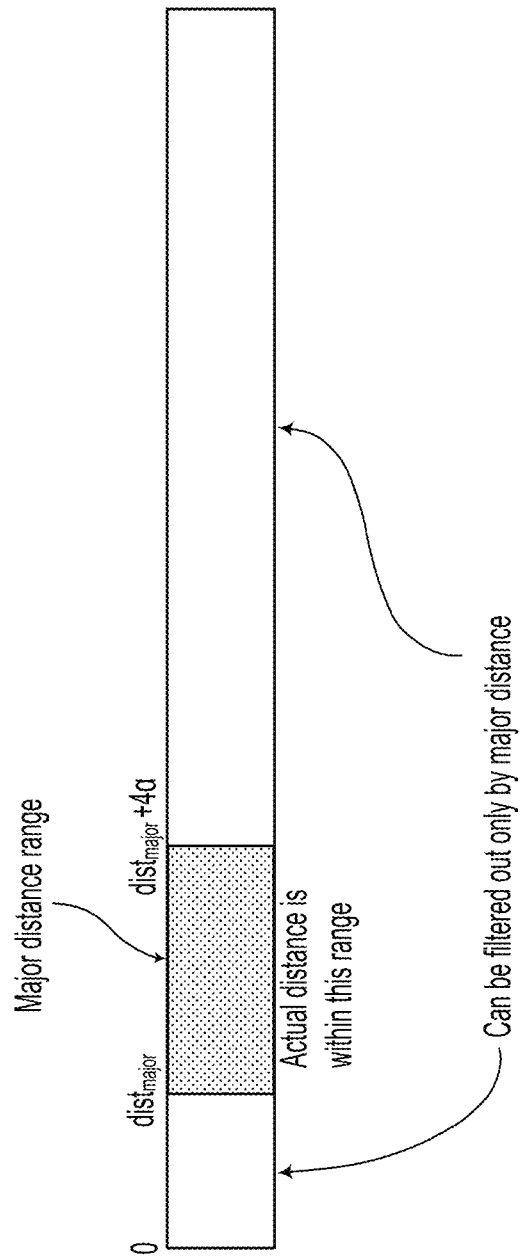
FIG. 15 illustrates an additional graphical representation showing regions that can be filtered out using the major distance.

FIG. 15 illustrates an additional graphical representation showing regions that can be filtered out using the major distance, according to some embodiments of the present disclosure. In the illustrated example, the Euclidean distance is used to compute the major distance and the minor distance.

Figure 16:
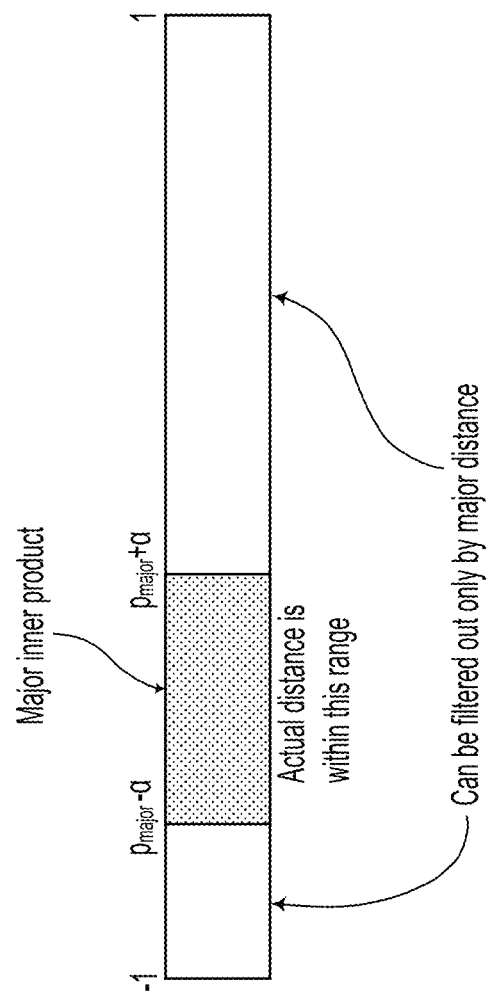
FIG. 16 illustrates an additional graphical representation showing regions that can be filtered out using the major distance.

FIG. 16 illustrates an additional graphical representation showing regions that can be filtered out using the major distance, according to some embodiments of the present disclosure. In the illustrated example, the Cosine distance is used to compute the major distance and the minor distance.

Figure 17:
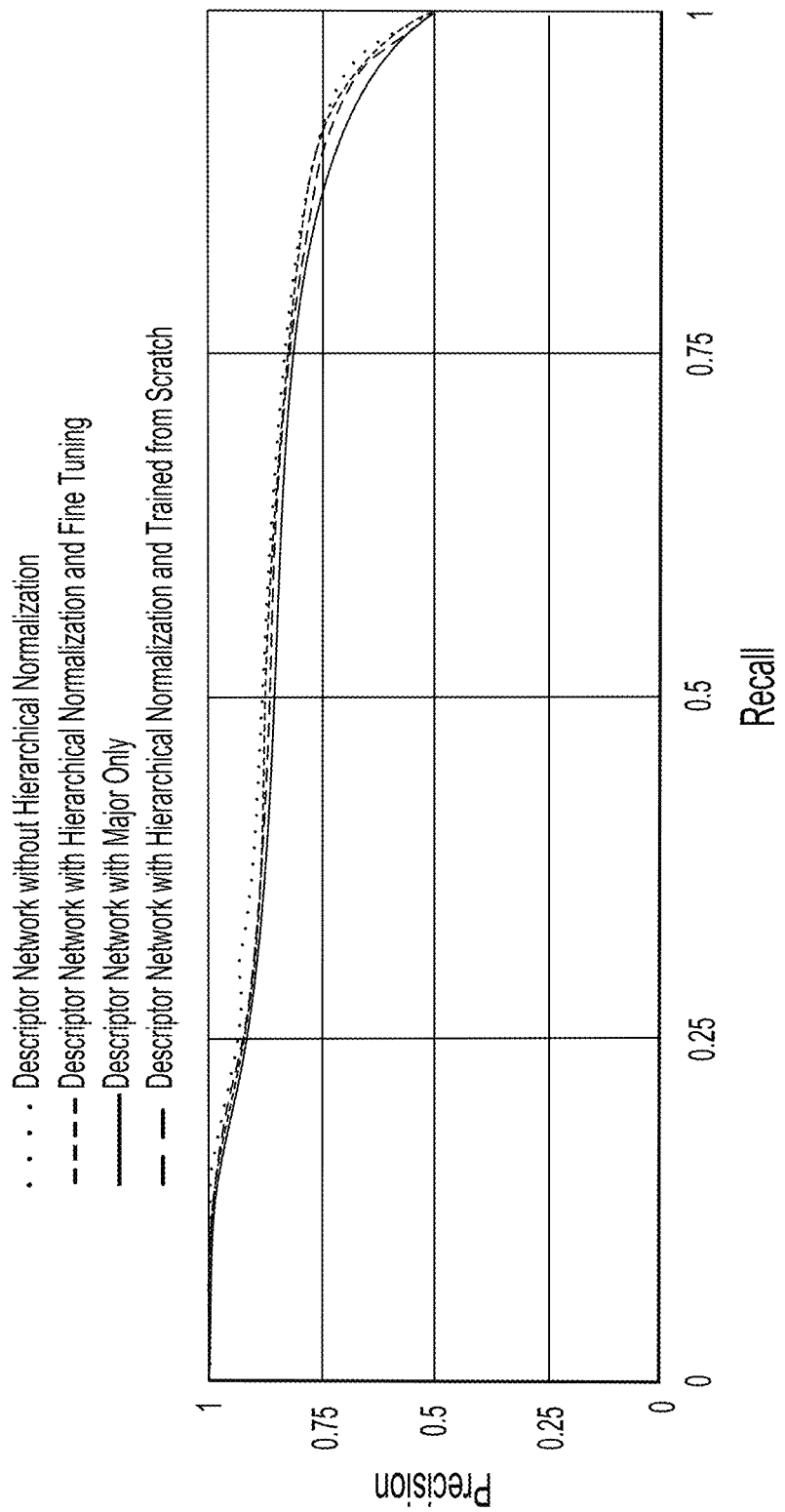
FIG. 17 illustrates a graph showing experimental results of a descriptor network.

FIG. 17 illustrates a graph showing experimental results of the described descriptor network, according to some embodiments of the present disclosure. The illustrated graph shows precision as a function of recall.

Figure 18:
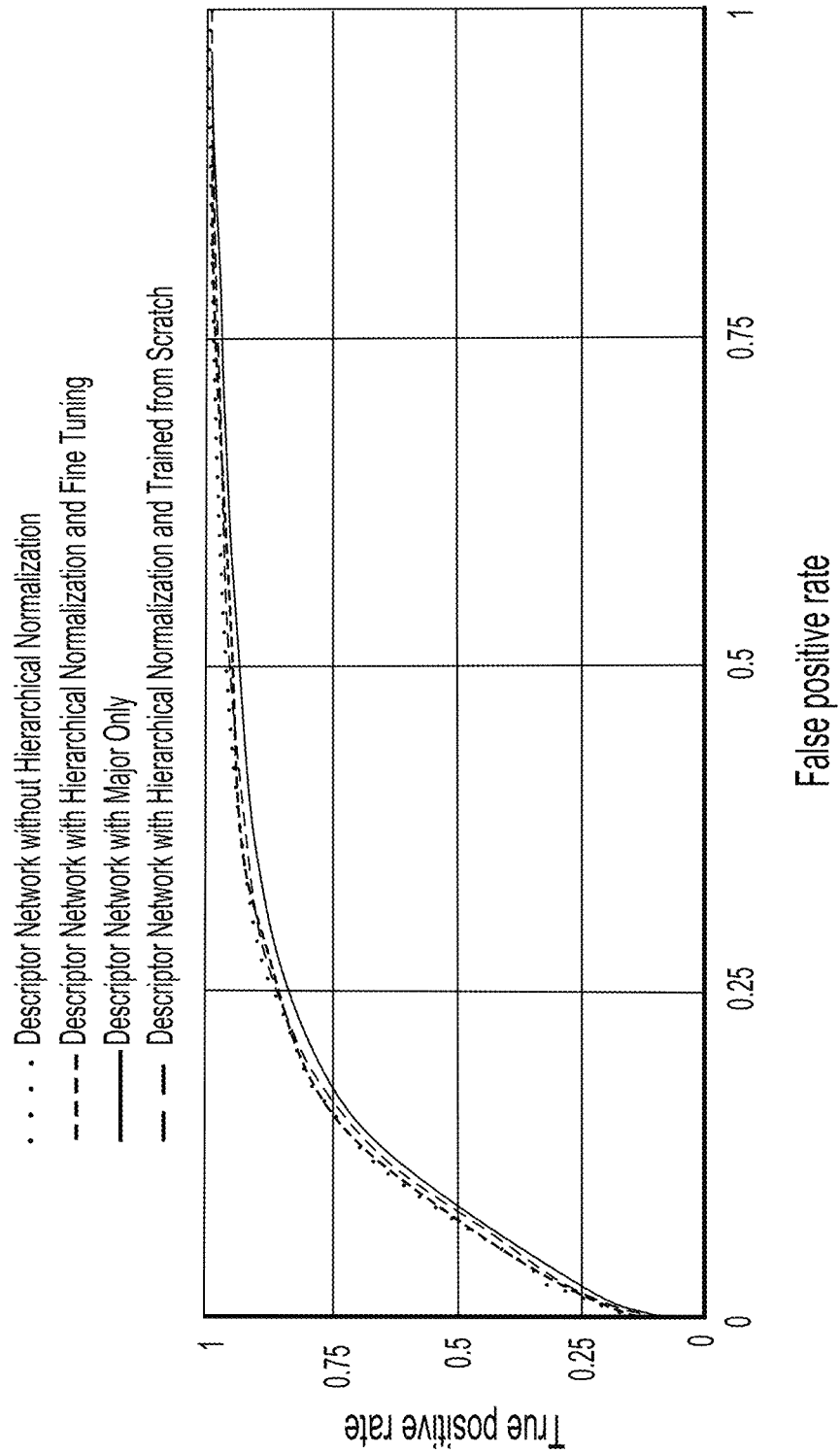
FIG. 18 illustrates a graph showing experimental results of a descriptor network.

FIG. 18 illustrates a graph showing experimental results of the described descriptor network, according to some embodiments of the present disclosure. The illustrated graph shows true positive rate as a function of false positive rate. Fine tuning was performed by training uniformly over 300 epochs and then fine tune training non-uniformly over 30 epochs.

Figure 19:
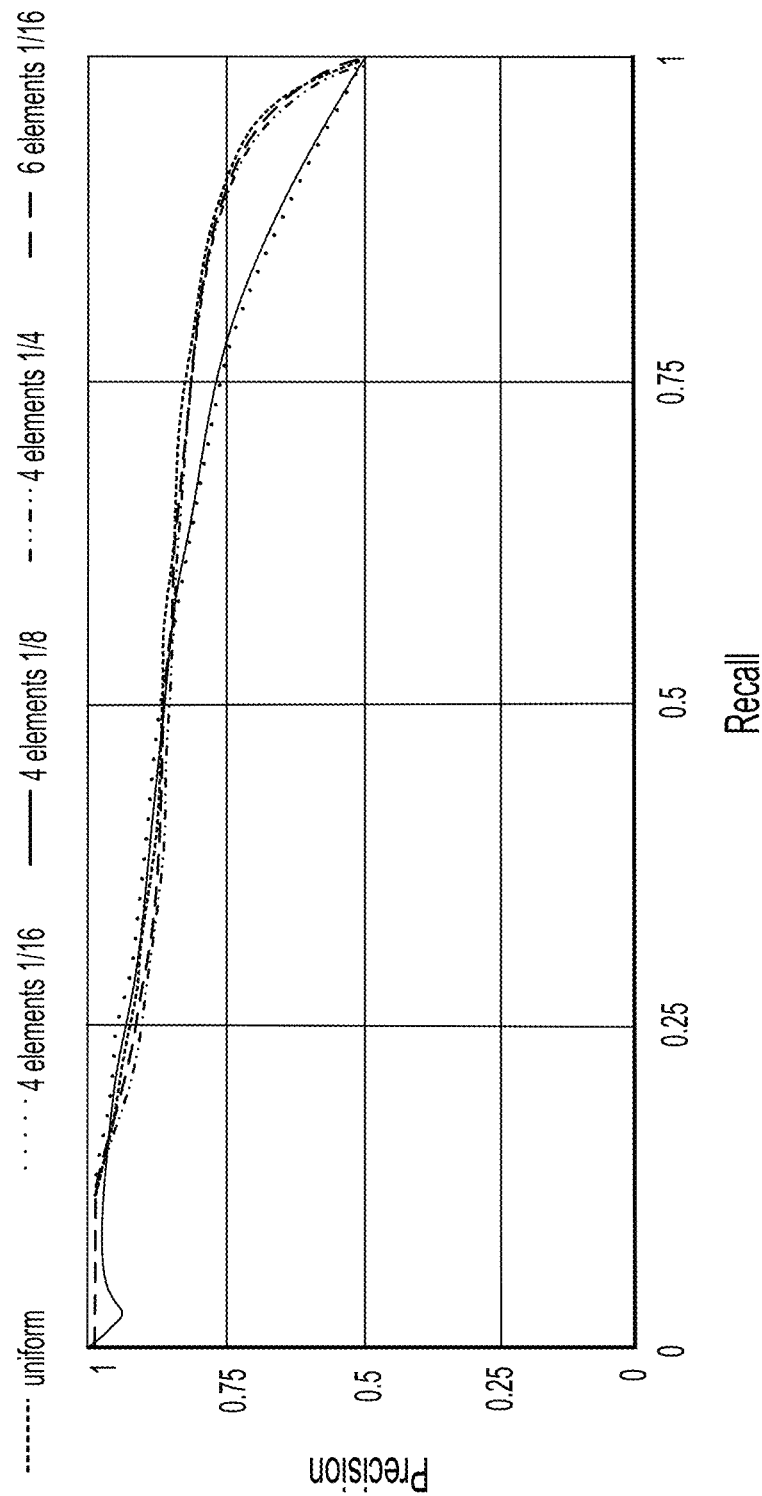
FIG. 19 illustrates a graph showing experimental results of a descriptor network.

FIG. 19 illustrates a graph showing experimental results of the described descriptor network, according to some embodiments of the present disclosure. The illustrated graph shows precision as a function of recall.

Figure 20:
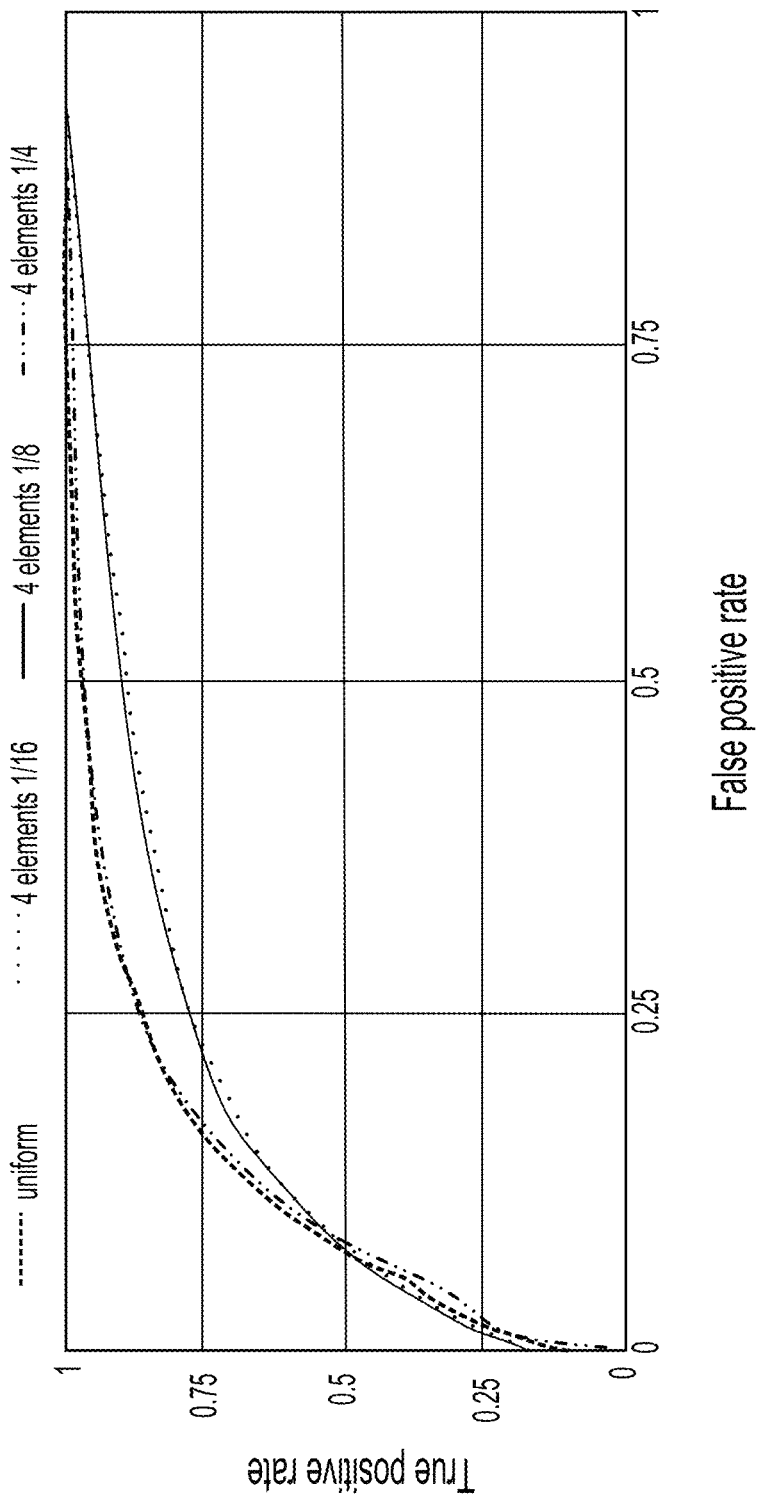
FIG. 20 illustrates a graph showing experimental results of a descriptor network.

FIG. 20 illustrates a graph showing experimental results of the described descriptor network, according to some embodiments of the present disclosure. The illustrated graph shows true positive rate as a function of false positive rate.

FIG. 21 illustrates an example image descriptor 2100 having multiple major vectors, according to some embodiments of the present disclosure. While the descriptor network is generally described herein as generating image descriptors having a major vector and a minor vector, embodiments of the present disclosure further include descriptor networks configured to generate image descriptors having multiple major vector. In the illustrated example, image descriptor 2100 includes a first major vector, a second major vector, a third major vector, and a minor vector. In some embodiments, the first major vector may include fewer elements than the second major vector, which may include fewer elements than the third major vector, which may include fewer element than the minor vector.

When generating image descriptor 2100, a hierarchical normalization can be imposed as follows: the first major vector can be normalized to a first major normalization amount, the second major vector can be normalized to a second major normalization amount, the second major normalization amount being less than the first major normalization amount, the third major vector can be normalized to a third major normalization amount, the third major normalization amount being less than the second major normalization amount, and the minor vector can be normalized to a minor normalization amount, the minor normalization amount being less than the third major normalization amount.

Figure 22:
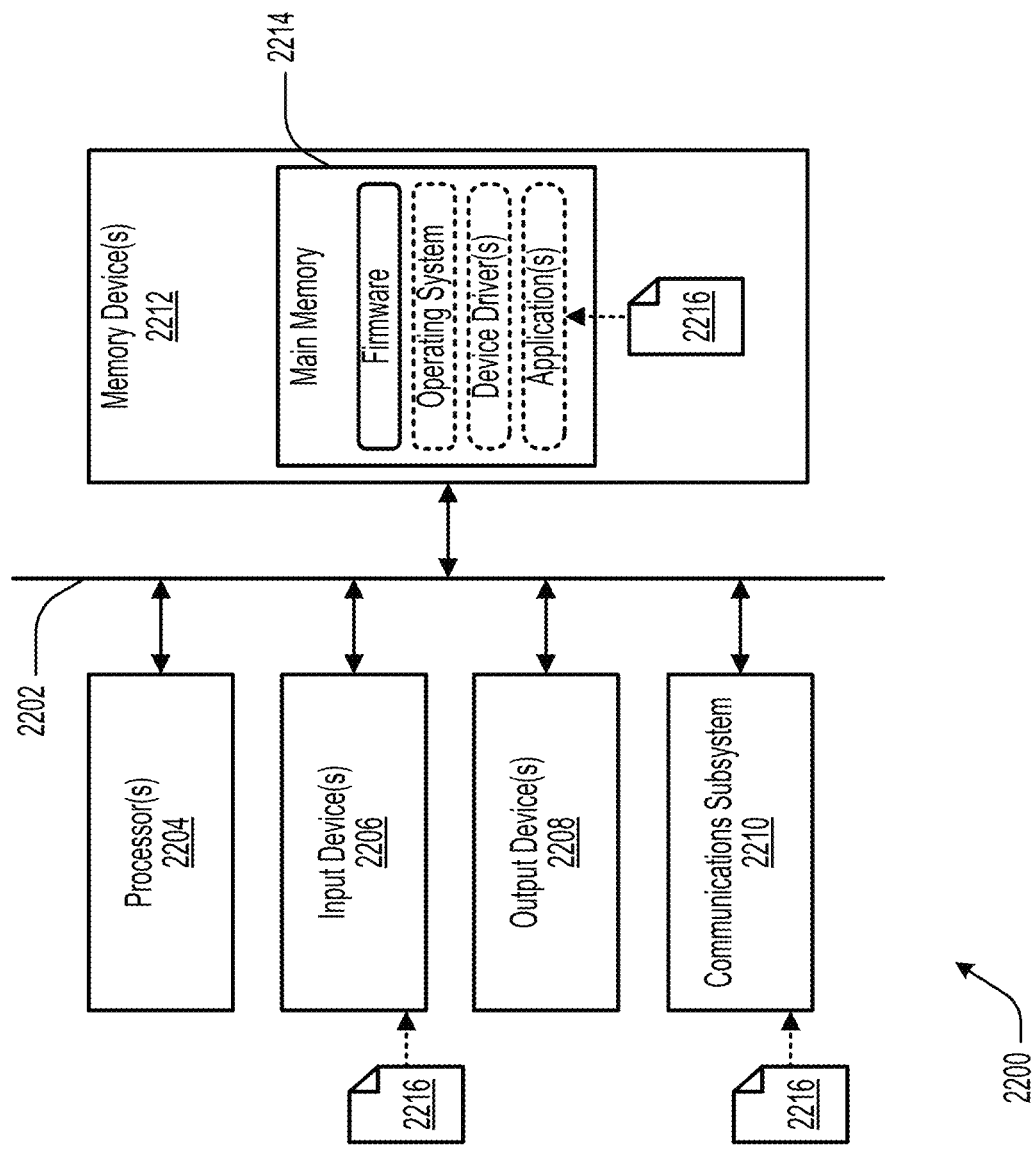
FIG. 22 illustrates a simplified computer system.

FIG. 22 illustrates an example computer system 2200 comprising various hardware elements, according to some embodiments of the present disclosure. Computer system 2200 may be incorporated into or integrated with devices described herein and/or may be configured to perform some or all of the steps of the methods provided by various embodiments. For example, in various embodiments, computer system 2200 may be configured to perform methods 400 or 500. It should be noted that FIG. 22 is meant only to provide a generalized illustration of various components, any or all of which may be utilized as appropriate. FIG. 22, therefore, broadly illustrates how individual system elements may be implemented in a relatively separated or relatively more integrated manner.

In the illustrated example, computer system 2200 includes a communication medium 2202, one or more processor(s) 2204, one or more input device(s) 2206, one or more output device(s) 2208, a communications subsystem 2210, and one or more memory device(s) 2212. Computer system 2200 may be implemented using various hardware implementations and embedded system technologies. For example, one or more elements of computer system 2200 may be implemented as a field-programmable gate array (FPGA), such as those commercially available by XILINX®, INTEL®, or LATTICE SEMICONDUCTOR®, a system-on-a-chip (SoC), an application-specific integrated circuit (ASIC), an application-specific standard product (ASSP), a microcontroller, and/or a hybrid device, such as an SoC FPGA, among other possibilities.

The various hardware elements of computer system 2200 may be coupled via communication medium 2202. While communication medium 2202 is illustrated as a single connection for purposes of clarity, it should be understood that communication medium 2202 may include various numbers and types of communication media for transferring data between hardware elements. For example, communication medium 2202 may include one or more wires (e.g., conductive traces, paths, or leads on a printed circuit board (PCB) or integrated circuit (IC), microstrips, striplines, coaxial cables), one or more optical waveguides (e.g., optical fibers, strip waveguides), and/or one or more wireless connections or links (e.g., infrared wireless communication, radio communication, microwave wireless communication), among other possibilities.

In some embodiments, communication medium 2202 may include one or more buses connecting pins of the hardware elements of computer system 2200. For example, communication medium 2202 may include a bus connecting processor(s) 2204 with main memory 2214, referred to as a system bus, and a bus connecting main memory 2214 with input device(s) 2206 or output device(s) 2208, referred to as an expansion bus. The system bus may consist of several elements, including an address bus, a data bus, and a control bus. The address bus may carry a memory address from processor(s) 2204 to the address bus circuitry associated with main memory 2214 in order for the data bus to access and carry the data contained at the memory address back to processor(s) 2204. The control bus may carry commands from processor(s) 2204 and return status signals from main memory 2214. Each bus may include multiple wires for carrying multiple bits of information and each bus may support serial or parallel transmission of data.

Processor(s) 2204 may include one or more central processing units (CPUs), graphics processing units (GPUs), neural network processors or accelerators, digital signal processors (DSPs), and/or the like. A CPU may take the form of a microprocessor, which is fabricated on a single IC chip of metal-oxide-semiconductor field-effect transistor (MOSFET) construction. Processor(s) 2204 may include one or more multi-core processors, in which each core may read and execute program instructions simultaneously with the other cores.

Input device(s) 2206 may include one or more of various user input devices such as a mouse, a keyboard, a microphone, as well as various sensor input devices, such as an image capture device, a pressure sensor (e.g., barometer, tactile sensor), a temperature sensor (e.g., thermometer, thermocouple, thermistor), a movement sensor (e.g., accelerometer, gyroscope, tilt sensor), a light sensor (e.g., photodiode, photodetector, charge-coupled device), and/or the like. Input device(s) 2206 may also include devices for reading and/or receiving removable storage devices or other removable media. Such removable media may include optical discs (e.g., Blu-ray discs, DVDs, CDs), memory cards (e.g., CompactFlash card, Secure Digital (SD) card, Memory Stick), floppy disks, Universal Serial Bus (USB) flash drives, external hard disk drives (HDDs) or solid-state drives (SSDs), and/or the like.

Output device(s) 2208 may include one or more of various devices that convert information into human-readable form, such as without limitation a display device, a speaker, a printer, and/or the like. Output device(s) 2208 may also include devices for writing to removable storage devices or other removable media, such as those described in reference to input device(s) 2206. Output device(s) 2208 may also include various actuators for causing physical movement of one or more components. Such actuators may be hydraulic, pneumatic, electric, and may be provided with control signals by computer system 2200.

Communications subsystem 2210 may include hardware components for connecting computer system 2200 to systems or devices that are located external to computer system 2200, such as over a computer network. In various embodiments, communications subsystem 2210 may include a wired communication device coupled to one or more input/output ports (e.g., a universal asynchronous receiver-transmitter (UART)), an optical communication device (e.g., an optical modem), an infrared communication device, a radio communication device (e.g., a wireless network interface controller, a BLUETOOTH® device, an IEEE 802.11 device, a Wi-Fi device, a Wi-Max device, a cellular device), among other possibilities.

Memory device(s) 2212 may include the various data storage devices of computer system 2200. For example, memory device(s) 2212 may include various types of computer memory with various response times and capacities, from faster response times and lower capacity memory, such as processor registers and caches (e.g., L0, L1, L2), to medium response time and medium capacity memory, such as random access memory, to lower response times and lower capacity memory, such as solid state drives and hard drive disks. While processor(s) 2204 and memory device(s) 2212 are illustrated as being separate elements, it should be understood that processor(s) 2204 may include varying levels of on-processor memory, such as processor registers and caches that may be utilized by a single processor or shared between multiple processors.

Memory device(s) 2212 may include main memory 2214, which may be directly accessible by processor(s) 2204 via the memory bus of communication medium 2202. For example, processor(s) 2204 may continuously read and execute instructions stored in main memory 2214. As such, various software elements may be loaded into main memory 2214 to be read and executed by processor(s) 2204 as illustrated in FIG. 22. Typically, main memory 2214 is volatile memory, which loses all data when power is turned off and accordingly needs power to preserve stored data. Main memory 2214 may further include a small portion of non-volatile memory containing software (e.g., firmware, such as BIOS) that is used for reading other software stored in memory device(s) 2212 into main memory 2214. In some embodiments, the volatile memory of main memory 2214 is implemented as random-access memory (RAM), such as dynamic RAM (DRAM), and the non-volatile memory of main memory 2214 is implemented as read-only memory (ROM), such as flash memory, erasable programmable read-only memory (EPROM), or electrically erasable programmable read-only memory (EEPROM).

Computer system 2200 may include software elements, shown as being currently located within main memory 2214, which may include an operating system, device driver(s), firmware, compilers, and/or other code, such as one or more application programs, which may include computer programs provided by various embodiments of the present disclosure. Merely by way of example, one or more steps described with respect to any methods discussed above, might be implemented as instructions 2216, executable by computer system 2200. In one example, such instructions 2216 may be received by computer system 2200 using communications subsystem 2210 (e.g., via a wireless or wired signal carrying instructions 2216), carried by communication medium 2202 to memory device(s) 2212, stored within memory device(s) 2212, read into main memory 2214, and executed by processor(s) 2204 to perform one or more steps of the described methods. In another example, instructions 2216 may be received by computer system 2200 using input device(s) 2206 (e.g., via a reader for removable media), carried by communication medium 2202 to memory device(s) 2212, stored within memory device(s) 2212, read into main memory 2214, and executed by processor(s) 2204 to perform one or more steps of the described methods.

In some embodiments of the present disclosure, instructions 2216 are stored on a computer-readable storage medium, or simply computer-readable medium. Such a computer-readable medium may be non-transitory, and may therefore be referred to as a non-transitory computer-readable medium. In some cases, the non-transitory computer-readable medium may be incorporated within computer system 2200. For example, the non-transitory computer-readable medium may be one of memory device(s) 2212, as shown in FIG. 22, with instructions 2216 being stored within memory device(s) 2212. In some cases, the non-transitory computer-readable medium may be separate from computer system 2200. In one example, the non-transitory computer-readable medium may be a removable media provided to input device(s) 2206, such as those described in reference to input device(s) 2206, as shown in FIG. 22, with instructions 2216 being provided to input device(s) 2206. In another example, the non-transitory computer-readable medium may be a component of a remote electronic device, such as a mobile phone, that may wirelessly transmit a data signal carrying instructions 2216 to computer system 2200 using communications subsystem 2210, as shown in FIG. 22, with instructions 2216 being provided to communications sub system 2210.

Instructions 2216 may take any suitable form to be read and/or executed by computer system 2200. For example, instructions 2216 may be source code (written in a human-readable programming language such as Java, C, C++, C #, Python), object code, assembly language, machine code, microcode, executable code, and/or the like. In one example, instructions 2216 are provided to computer system 2200 in the form of source code, and a compiler is used to translate instructions 2216 from source code to machine code, which may then be read into main memory 2214 for execution by processor(s) 2204. As another example, instructions 2216 are provided to computer system 2200 in the form of an executable file with machine code that may immediately be read into main memory 2214 for execution by processor(s) 2204. In various examples, instructions 2216 may be provided to computer system 2200 in encrypted or unencrypted form, compressed or uncompressed form, as an installation package or an initialization for a broader software deployment, among other possibilities.

In one aspect of the present disclosure, a system (e.g., computer system 2200) is provided to perform methods in accordance with various embodiments of the present disclosure. For example, some embodiments may include a system comprising one or more processors (e.g., processor(s) 2204) that are communicatively coupled to a non-transitory computer-readable medium (e.g., memory device(s) 2212 or main memory 2214). The non-transitory computer-readable medium may have instructions (e.g., instructions 2216) stored therein that, when executed by the one or more processors, cause the one or more processors to perform the methods described in the various embodiments.

In another aspect of the present disclosure, a computer-program product that includes instructions (e.g., instructions 2216) is provided to perform methods in accordance with various embodiments of the present disclosure. The computer-program product may be tangibly embodied in a non-transitory computer-readable medium (e.g., memory device(s) 2212 or main memory 2214). The instructions may be configured to cause one or more processors (e.g., processor(s) 2204) to perform the methods described in the various embodiments.

In another aspect of the present disclosure, a non-transitory computer-readable medium (e.g., memory device(s) 2212 or main memory 2214) is provided. The non-transitory computer-readable medium may have instructions (e.g., instructions 2216) stored therein that, when executed by one or more processors (e.g., processor(s) 2204), cause the one or more processors to perform the methods described in the various embodiments.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes reference to one or more of such users, and reference to "a processor" includes reference to one or more processors and equivalents thereof known to those skilled in the art, and so forth.

Also, the words "comprise," "comprising," "contains," "containing," "include," "including," and "includes," when used in this specification and in the following claims, are intended to specify the presence of stated features, integers, components, or steps, but they do not preclude the presence or addition of one or more other features, integers, components, steps, acts, or groups.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A computer-implemented method comprising:
   receiving a first image and a second image;
   providing the first image and the second image to a descriptor network as input;
   generating, using the descriptor network, a first image descriptor based on the first image and a second image descriptor based on the second image, the first image descriptor including a first set of elements distributed between a first major vector and a first minor vector, and the second image descriptor including a second set of elements distributed between a second major vector and a second minor vector;
   computing a major distance between the first image and the second image based on the first major vector and the second major vector;
   comparing the major distance to a threshold;
   if the major distance is greater than the threshold, determining that the first image does not match the second image; and
   if the major distance is less than the threshold:
      computing a minor distance between the first image and the second image based on the first minor vector and the second minor vector;
      comparing a sum of the major distance and the minor distance to the threshold;
      if the sum is greater than the threshold, determining that the first image does not match the second image; and
      if the sum is less than the threshold, determining that the first image matches the second image.

2. The computer-implemented method of claim 1, wherein the first major vector comprises a first subset of the first set of elements, the first minor vector comprising a second subset of the first set of elements, the second major vector comprises a first subset of the second set of elements, and the second minor vector comprising a second subset of the second set of elements.

3. The computer-implemented method of claim 2, wherein the second subset of the first set of elements includes more elements than the first subset of the first set of elements, and the second subset of the second set of elements includes more elements than the first subset of the second set of elements.

4. The computer-implemented method of claim 2, wherein computing the major distance between the first image and the second image based on the first major vector and the second major vector includes:
   computing a sum of squares of differences between the first subset of the first set of elements and the first subset of the second set of elements.

5. The computer-implemented method of claim 1, further comprising:
   imposing a hierarchical normalization onto the first image descriptor by:
      normalizing the first major vector to a major normalization amount; and
      normalizing the first minor vector to a minor normalization amount.

6. The computer-implemented method of claim 5, further comprising:
   imposing the hierarchical normalization onto the second image descriptor by:
      normalizing the second major vector to the major normalization amount; and
      normalizing the second minor vector to the minor normalization amount.

7. The computer-implemented method of claim 6, wherein:
   the major normalization amount is equal to $1-\alpha$; and
   the minor normalization amount is equal to $\alpha$, wherein $\alpha$ is less than 0.5.

8. The computer-implemented method of claim 1, wherein the descriptor network is a neural network having a set of weights that are modifiable through a training process.

9. A system comprising:
   one or more processors; and
   a computer-readable medium storing instructions that, when executed by the one or more processors, cause the one or more processors to perform operations comprising:
      receiving a first image and a second image;
      providing the first image and the second image to a descriptor network as input;
      generating, using the descriptor network, a first image descriptor based on the first image and a second image descriptor based on the second image, the first image descriptor including a first set of elements distributed between a first major vector and a first minor vector, and the second image descriptor including a second set of elements distributed between a second major vector and a second minor vector;
      computing a major distance between the first image and the second image based on the first major vector and the second major vector;
      comparing the major distance to a threshold;
      if the major distance is greater than the threshold, determining that the first image does not match the second image; and
      if the major distance is less than the threshold:
         computing a minor distance between the first image and the second image based on the first minor vector and the second minor vector;

comparing a sum of the major distance and the minor distance to the threshold;

if the sum is greater than the threshold, determining that the first image does not match the second image; and if the sum is less than the threshold, determining that the first image matches the second image.

10. The system of claim 9, wherein the first major vector comprises a first subset of the first set of elements, the first minor vector comprising a second subset of the first set of elements, the second major vector comprises a first subset of the second set of elements, and the second minor vector comprising a second subset of the second set of elements.

11. The system of claim 10, wherein the second subset of the first set of elements includes more elements than the first subset of the first set of elements, and the second subset of the second set of elements includes more elements than the first subset of the second set of elements.

12. The system of claim 10, wherein computing the major distance between the first image and the second image based on the first major vector and the second major vector includes:

computing a sum of squares of differences between the first subset of the first set of elements and the first subset of the second set of elements.

13. The system of claim 9, wherein the operations further comprise:

imposing a hierarchical normalization onto the first image descriptor by:

normalizing the first major vector to a major normalization amount; and normalizing the first minor vector to a minor normalization amount.

14. The system of claim 13, wherein the operations further comprise:

imposing the hierarchical normalization onto the second image descriptor by:

normalizing the second major vector to the major normalization amount; and normalizing the second minor vector to the minor normalization amount.

15. The system of claim 14, wherein:

the major normalization amount is equal to $1-\alpha$; and the minor normalization amount is equal to $\alpha$, wherein $\alpha$ is less than 0.5.

16. The system of claim 9, wherein the descriptor network is a neural network having a set of weights that are modifiable through a training process.

17. A non-transitory machine-readable medium comprising instruction that, when executed by one or more processors, cause the one or more processors to perform operations comprising:

receiving a first image and a second image;

providing the first image and the second image to a descriptor network as input;

generating, using the descriptor network, a first image descriptor based on the first image and a second image descriptor based on the second image, the first image descriptor including a first set of elements distributed between a first major vector and a first minor vector, and the second image descriptor including a second set of elements distributed between a second major vector and a second minor vector;

computing a major distance between the first image and the second image based on the first major vector and the second major vector;

comparing the major distance to a threshold;

if the major distance is greater than the threshold, determining that the first image does not match the second image; and if the major distance is less than the threshold:

computing a minor distance between the first image and the second image based on the first minor vector and the second minor vector;

comparing a sum of the major distance and the minor distance to the threshold;

if the sum is greater than the threshold, determining that the first image does not match the second image; and if the sum is less than the threshold, determining that the first image matches the second image.

18. The non-transitory machine-readable medium of claim 17, wherein the first major vector comprises a first subset of the first set of elements, the first minor vector comprising a second subset of the first set of elements, the second major vector comprises a first subset of the second set of elements, and the second minor vector comprising a second subset of the second set of elements.

19. The non-transitory machine-readable medium of claim 18, wherein the second subset of the first set of elements includes more elements than the first subset of the first set of elements, and the second subset of the second set of elements includes more elements than the first subset of the second set of elements.

20. The non-transitory machine-readable medium of claim 18, wherein computing the major distance between the first image and the second image based on the first major vector and the second major vector includes:

computing a sum of squares of differences between the first subset of the first set of elements and the first subset of the second set of elements.

* * * * *